United States Patent
Adams

(10) Patent No.: US 8,319,083 B2
(45) Date of Patent: Nov. 27, 2012

(54) ELECTRONIC SYSTEM, METHODS AND APPARATUS FOR TEACHING AND EXAMINING MUSIC

(75) Inventor: Jonathan Adams, Moratfield (AU)

(73) Assignee: Web Ed. Development Pty., Ltd., Queensland (AU)

( * ) Notice: Subject to any disclaimer, the term of this patent is extended or adjusted under 35 U.S.C. 154(b) by 471 days.

(21) Appl. No.: 12/518,930

(22) PCT Filed: Dec. 13, 2007

(86) PCT No.: PCT/AU2007/001922
§ 371 (c)(1),
(2), (4) Date: Jun. 12, 2009

(87) PCT Pub. No.: WO2008/070920
PCT Pub. Date: Jun. 19, 2008

(65) Prior Publication Data
US 2010/0011938 A1 Jan. 21, 2010

(30) Foreign Application Priority Data
Dec. 13, 2006 (AU) ................................ 2006906973

(51) Int. Cl.
*G09B 15/00* (2006.01)
*G09B 15/02* (2006.01)
*G09B 15/04* (2006.01)
(52) U.S. Cl. .................... 84/470 R; 84/477 R; 84/483.2
(58) Field of Classification Search ........................ None
See application file for complete search history.

(56) References Cited

U.S. PATENT DOCUMENTS

| 5,146,833 | A | * | 9/1992 | Lui ................................ 84/462 |
| 5,533,903 | A | * | 7/1996 | Kennedy .................... 434/307 R |
| 5,665,927 | A | * | 9/1997 | Taki et al. ........................ 84/609 |
| 6,987,220 | B2 | | 1/2006 | Holcombe |
| 7,194,686 | B1 | * | 3/2007 | Suzuki et al. ................. 715/716 |
| 7,495,165 | B2 | * | 2/2009 | Suzuki et al. .................... 84/622 |
| 7,539,941 | B2 | * | 5/2009 | Suzuki et al. ................. 715/716 |
| 7,767,895 | B2 | * | 8/2010 | Johnston ...................... 84/483.2 |
| 2003/0151628 | A1 | | 8/2003 | Salter |
| 2003/0167902 | A1 | * | 9/2003 | Hiner et al. ................. 84/477 R |
| 2004/0025668 | A1 | | 2/2004 | Jarrett et al. |
| 2004/0094017 | A1 | * | 5/2004 | Suzuki et al. .................... 84/609 |
| 2004/0173082 | A1 | | 9/2004 | Bancroft et al. |
| 2008/0141849 | A1 | * | 6/2008 | Johnston ...................... 84/483.2 |
| 2008/0196575 | A1 | * | 8/2008 | Good .......................... 84/470 R |
| 2009/0301287 | A1 | * | 12/2009 | Harvey et al. ................... 84/609 |
| 2010/0095828 | A1 | * | 4/2010 | Adams ........................ 84/470 R |
| 2010/0288105 | A1 | * | 11/2010 | Rose ........................... 84/483.2 |

(Continued)

OTHER PUBLICATIONS

Written Opinion in PCT/AU2007/001922, mailed Mar. 19, 2008.

(Continued)

*Primary Examiner* — Marlo Fletcher
(74) *Attorney, Agent, or Firm* — Womble Carlyle

(57) ABSTRACT

Electronic systems, methods and apparatus for teaching and examining music are presented. The method includes presenting a user with one or more musical tasks and providing a menu with one or more selectable icons. Selection of one of the icons activates functionality to enable the user to form an element of musical notation. The method includes comparing one or more characteristics of the element of musical notation with one or more predetermined thresholds in response to a user request and generating a mark, score or grade based on the result of the comparison.

18 Claims, 23 Drawing Sheets

U.S. PATENT DOCUMENTS

| | | | |
|---|---|---|---|
| 2010/0313736 A1* | 12/2010 | Lenz | 84/477 R |
| 2011/0030535 A1* | 2/2011 | Charles | 84/483.2 |
| 2011/0107899 A1* | 5/2011 | Charles | 84/483.2 |
| 2011/0179940 A1* | 7/2011 | Humphrey | 84/470 R |
| 2011/0185880 A1* | 8/2011 | Charles | 84/477 R |
| 2011/0252946 A1* | 10/2011 | Armstrong | 84/483.2 |

OTHER PUBLICATIONS

International Search Report in PCT/AU2007/001922, mailed Mar. 19, 2008.

International Preliminary Report on Patentability in PCT/AU2007/001922; dated Jun. 25, 2009.

* cited by examiner

FIG 19

ELECTRONIC SYSTEM, METHODS AND APPARATUS FOR TEACHING AND EXAMINING MUSIC

FIELD OF THE INVENTION

The present invention relates to an electronic system, methods and apparatus for teaching and examining in the field of music.

BACKGROUND TO THE INVENTION

Music theory is the study of the elements of music including rhythm, harmony, melody, structure and texture and students learn how to read, write and analyse music and all its components. For centuries, the process of teaching and learning music theory and the process of examining students and their level of proficiency has remained unchanged. Even today, conventional books are still used to teach students how to read, write and analyse music and examinations in music theory are still undertaken and marked manually. Disadvantages associated with such a process include the time and cost in printing the books and marking the examination papers, the minimal feedback that is provided to students in relation to their examinations and the delay in providing the results of the examinations and feedback to the students.

Modern technology has provided some advancement in the field of writing, teaching, printing and publishing music. For example, numerous software packages are available that enable composers to electronically write music via a computer. One example of such software is Sibelius 4 available from Sibelius Software, which comprises a plurality of toolbars and menus from which a composer can select the desired notes and other musical notation to compose a score. The software can automatically update instrumental parts when the full score is updated and the software also plays the composed score allowing composers to listen to their composition. A further enhancement includes video for which music can be written via the software. Teaching aspects of the software include lesson plans and explanations of musical concepts.

However, such software applications do not educate students how to correctly form the notes and other musical notation, how to correctly position them or other aspects of writing music. Such software applications also fail to address the aforementioned drawbacks associated with examining students and marking students' examination papers.

In this specification, the terms "comprises", "comprising" or similar terms are intended to mean a non-exclusive inclusion, such that a method, system or apparatus that comprises a list of elements does not include those elements solely, but may well include other elements not listed.

OBJECT OF THE INVENTION

It is an object of the present invention to address or at least ameliorate one or more of the aforementioned problems of the prior art or provide a useful commercial alternative.

SUMMARY OF THE INVENTION

In one form, although it need not be the only or indeed the broadest form, the invention resides in a method of teaching and examining in the field of music, said method including:
presenting a user with one or more musical tasks;
providing a menu with one or more selectable icons, selection of one of said icons activating functionality to enable the user to form an element of musical notation;
generating a mark based on the result of comparing one or more characteristics of the element of musical notation with one or more predetermined thresholds.

Suitably, comparing one or more characteristics of the element of musical notation and generating a mark is in response to a user request.

Elements of musical notation can include, but are not limited to, notes, or parts of notes, such as note stems, note heads, note beams, quaver tails, symbols, or parts of symbols, such as flats, sharps, naturals, crotchet rests, bass clefs, treble clefs, barlines, slurs, lines, curves, hooks, leger lines, staff lines, time signatures, accidentals, articulations, dynamics.

Characteristics of the elements of musical notation can include, but are not limited to, a position on a musical staff, a spacing between an adjacent element, angle, length, alignment, points of intersection, start points, end points, ratios, relative size, name, quantity.

In another form, although again not necessarily the broadest form, the invention resides in a system for teaching and examining in the field of music, said system comprising:
a display to present a user with one or more musical tasks and a menu with one or more selectable icons;
an input device to allow the user to select the one or more selectable icons; and
a processor coupled to be in communication with the display and the input device to:
a) activate functionality to enable the user to form an element of musical notation with the input device in response to selection of one of said icons;
b) compare one or more characteristics of the element of musical notation with one or more predetermined thresholds; and
c) generate a mark based on the result of comparing the one or more characteristics of the element of musical notation with one or more predetermined thresholds.

Suitably, comparing the one or more characteristics of the element of musical notation and generating a mark is in response to a user request.

The system may further comprise a storage facility, such as a database coupled to be in communication with the processor to store the marks and/or the answers to the one or more musical tasks.

Further forms and features of the present invention will become apparent from the following detailed description.

BRIEF DESCRIPTION OF THE DRAWINGS

By way of example only, preferred embodiments of the invention will be described more fully hereinafter with reference to the accompanying drawings, wherein:

FIGS. 13-21 are further screenshots showing examining and marking musical tasks to be completed by users as exercises and/or examination questions;

DETAILED DESCRIPTION OF THE INVENTION

Figure 1:
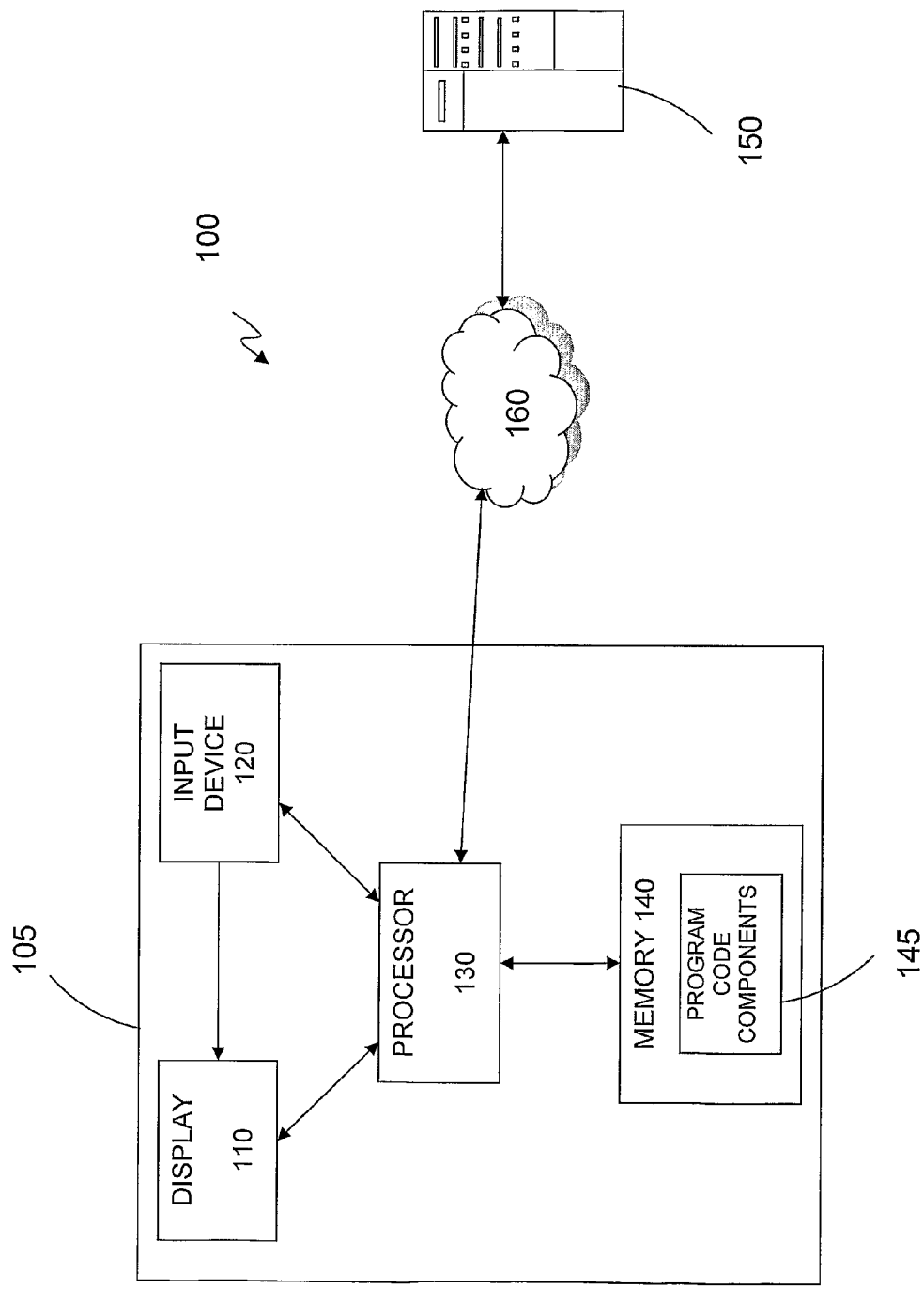
FIG. 1 is a schematic representation of a system for teaching and examining in the field of music in accordance with an embodiment of the present invention.

Like features in the drawings are referred to by like reference numerals.

Referring to FIG. 1, there is provided a system 100 for teaching and examining in the field of music in accordance with embodiments of the present invention. The system 100 comprises a display 110 and an input device 120, both of which are coupled to be in communication with a processor 130. Processor 130 is also coupled to be in communication with a memory 140. Display 110, input device 120, processor 130 and memory 140 can be embodied in an apparatus 105 in the form of a conventional computing device, such as a desktop, laptop or notebook computer, personal digital assistant (PDA) or other mobile computing device.

In accordance with embodiments of the present invention, display 110 is provided to present a user with one or more musical tasks and to present a menu with one or more selectable icons. Display 110 can be in the form of an integral screen or a separate monitor or the like and can be in the form of a touch sensitive screen. Input device 120, such as a keyboard, mouse, or a stylus that can be used in conjunction with a touch sensitive screen, is provided to allow the user to select the one or more selectable icons from the menu and generally navigate through the musical tasks. The processor 130 is provided to activate functionality stored in the memory 140 in the form of computer readable program code components 145 to enable the user to form elements of musical notation with the input device 120 in response to selection of one of the icons. The processor 130 is also provided to compare one or more characteristics of the element of musical notation with one or more predetermined thresholds in response to a user request, such as requesting marking of the task by selecting a suitable icon. The processor 130 generates a mark based on the result of comparing the one or more characteristics of the element of musical notation with one or more predetermined thresholds and the mark can be displayed to the user via display 110 to promptly provide feedback to the user.

According to some embodiments, the system 100 can further comprise a storage facility 150, such as a database, optionally associated with a server, coupled to be in communication with the processor 130 via conventional communications hardware and software to store the marks of the lessons/examinations for each user. The storage facility 150 can be coupled to the processor 130 locally or via a communications network 160, for example, a local area network (LAN), a wide area network (WAN) or combination thereof, or a global communication network, such as the Internet. Communication between the processor 130 and the storage facility 150 can be wired or wireless or a combination thereof.

Figure 23:
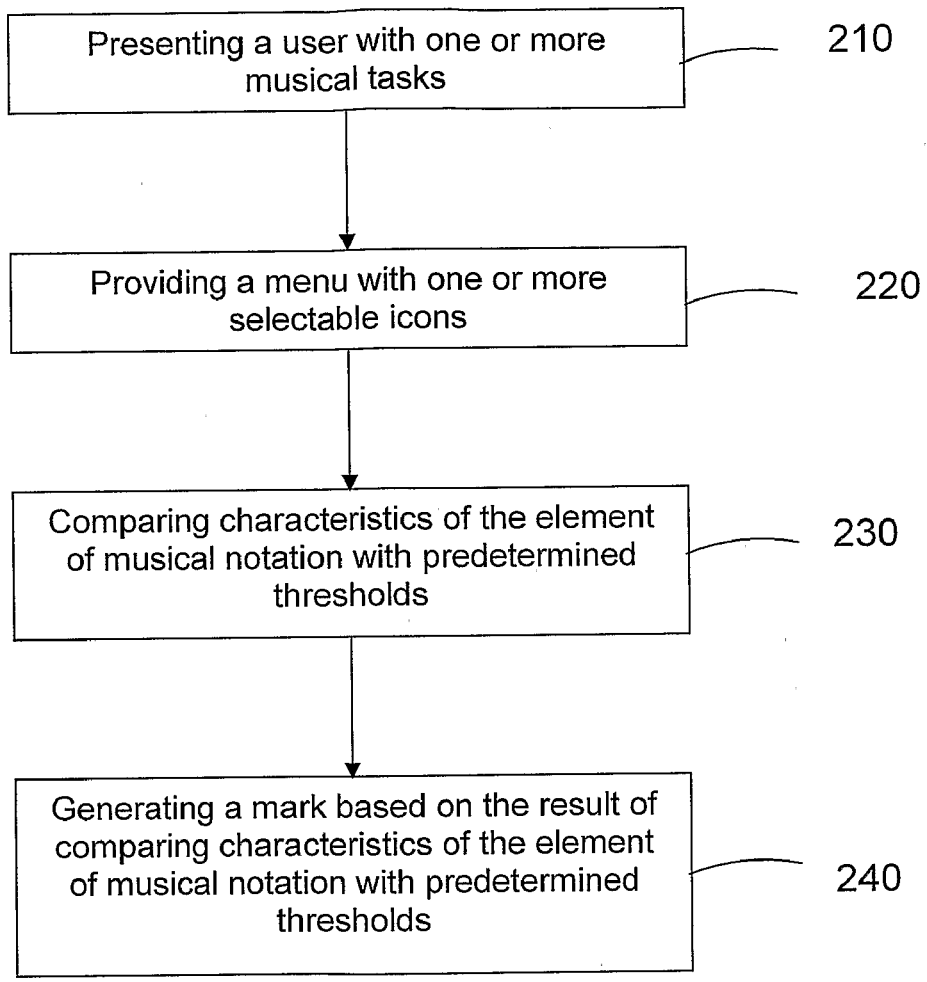
FIG. 23 is a general flow diagram showing a method according to embodiments of the present invention.

With reference to the general flow diagram shown in FIG. 23, a method 200 for teaching and examining music includes at 210 presenting a user with one or more musical tasks, such as, but not limited to drawing a musical scale, identifying notes or completing a melody. At 220, the method includes, providing a menu with one or more selectable icons, selection of one of said icons activating functionality to enable the user to form an element of musical notation. The method includes at 230 comparing one or more characteristics of the element of musical notation with one or more predetermined thresholds to verify whether the user has completed the musical task correctly. At 240, generating a mark based on the result of comparing the one or more characteristics of the element of musical notation with one or more predetermined thresholds.

Examples of teaching and examining in the field of music in accordance with embodiments of the present invention will now be described with reference to the screenshots in FIGS. 2-22.

Figure 2:
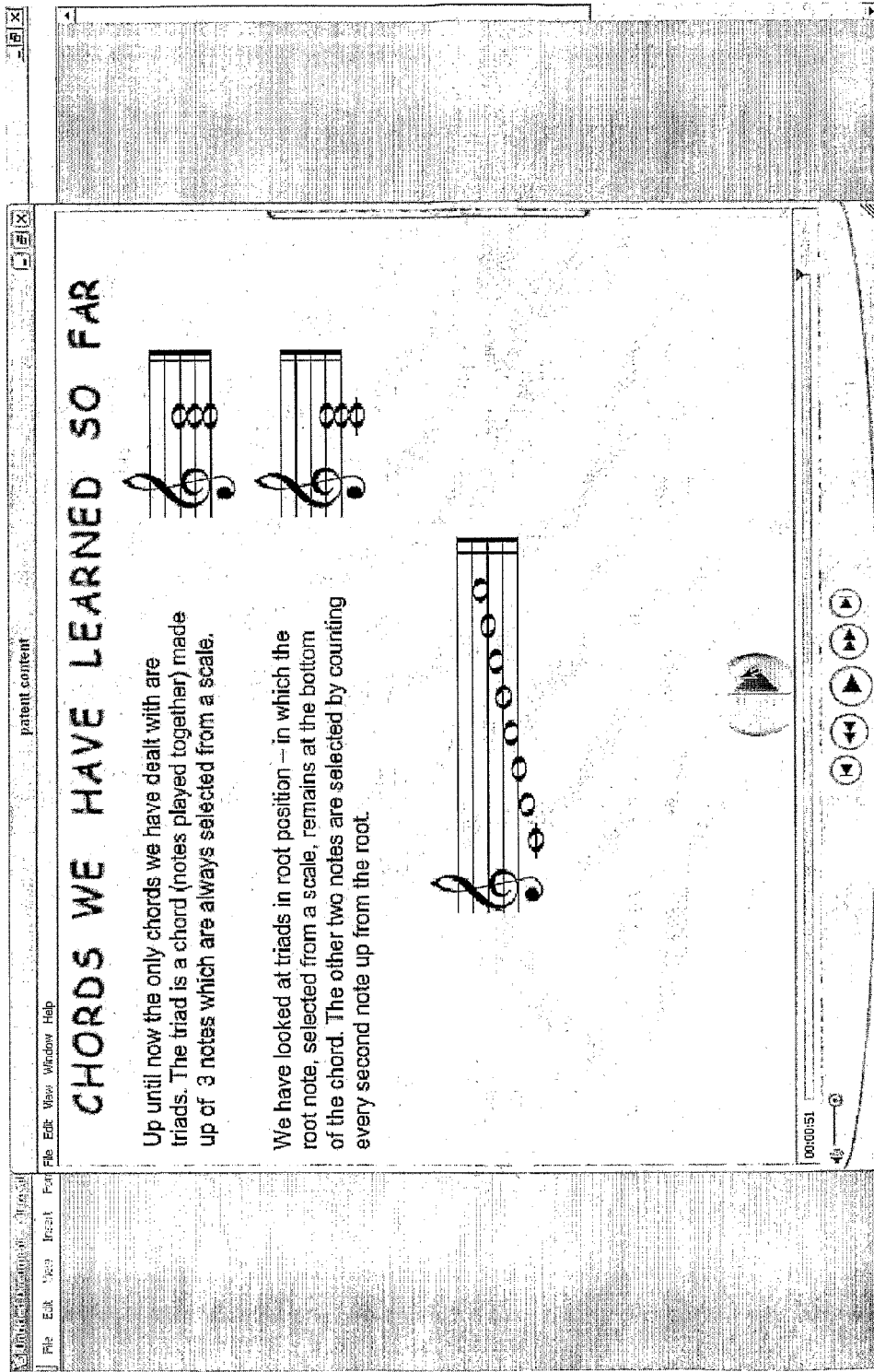
FIG. 2 is a screenshot showing part of a lesson in accordance with an embodiment of the present invention.

Referring to FIG. 2, the screenshot shows part of a lesson comparable with how the lesson would be conveyed to a user or student by the prior art in that a chord is displayed with a description of its composition. However, in contrast to the prior art, one of the benefits of the present invention is that it includes animation and can visually demonstrate formation of the chord from the individual notes. Another benefit of the present invention is that the individual notes and the chord can be played and heard by the user, thus providing a major advantage over the conventional paper methods of teaching music.

Figure 3:
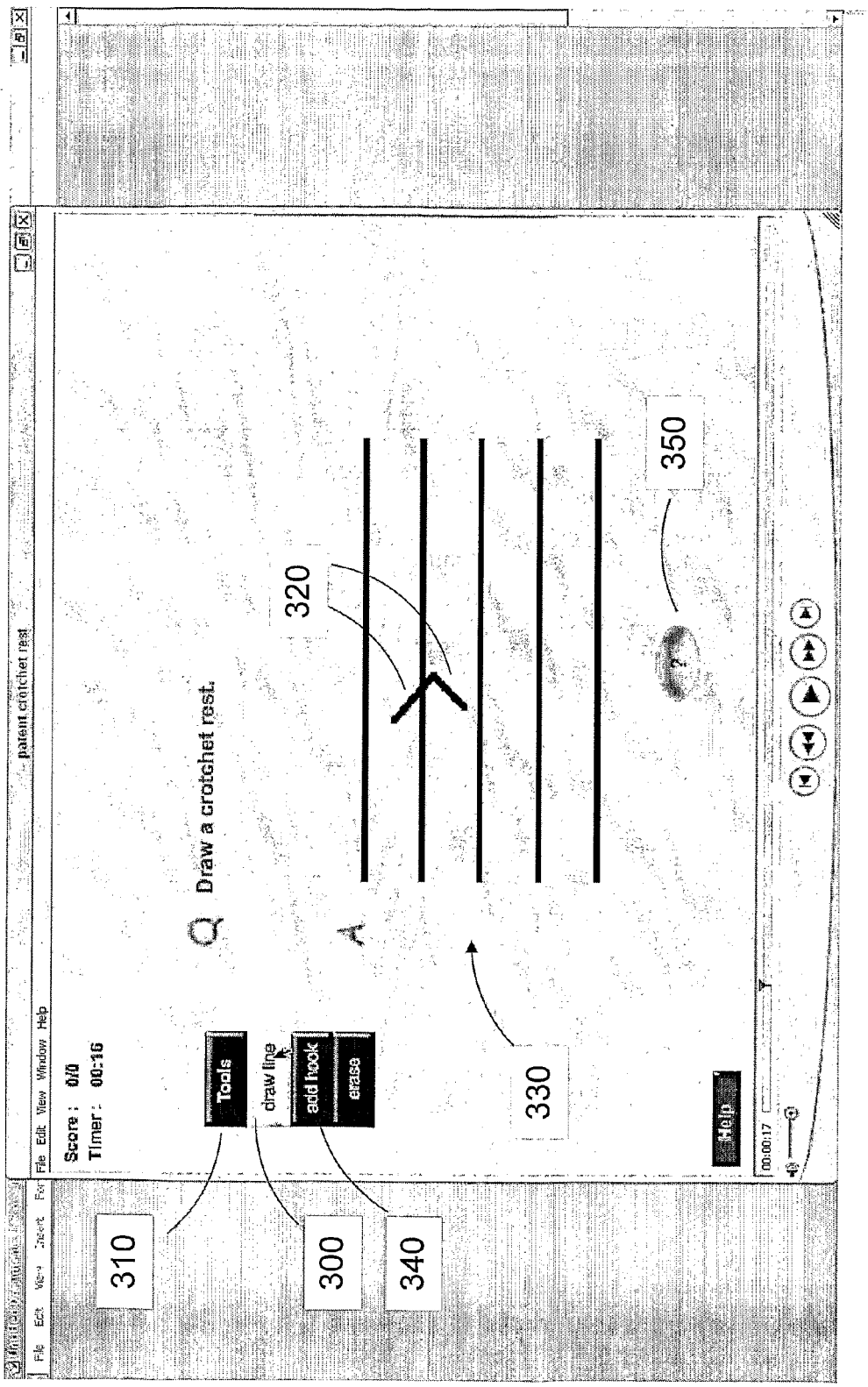
FIGS. 3-5 are screenshots demonstrating the teaching and marking of drawing a crotchet rest.
Figure 4:
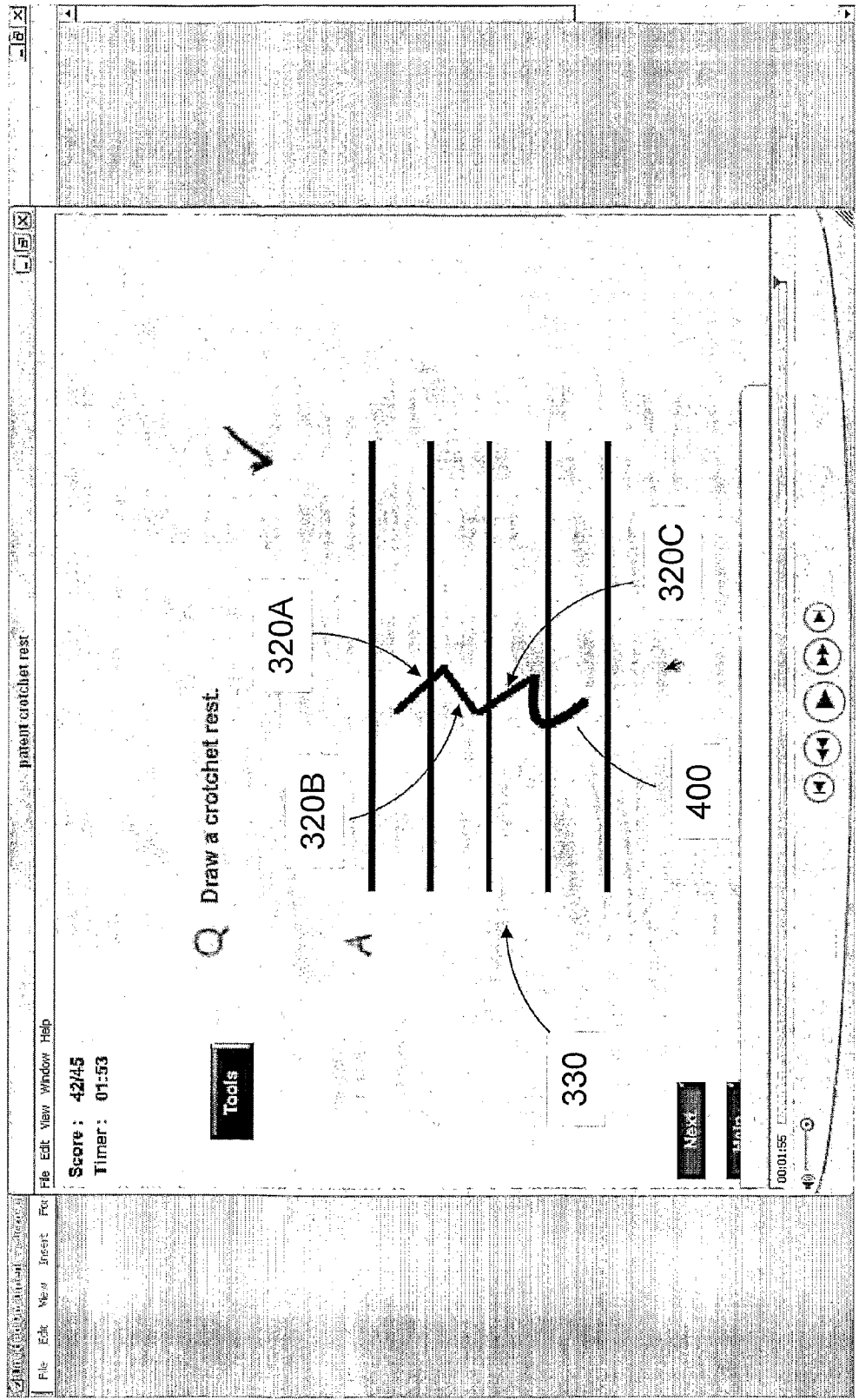
Figure 5:
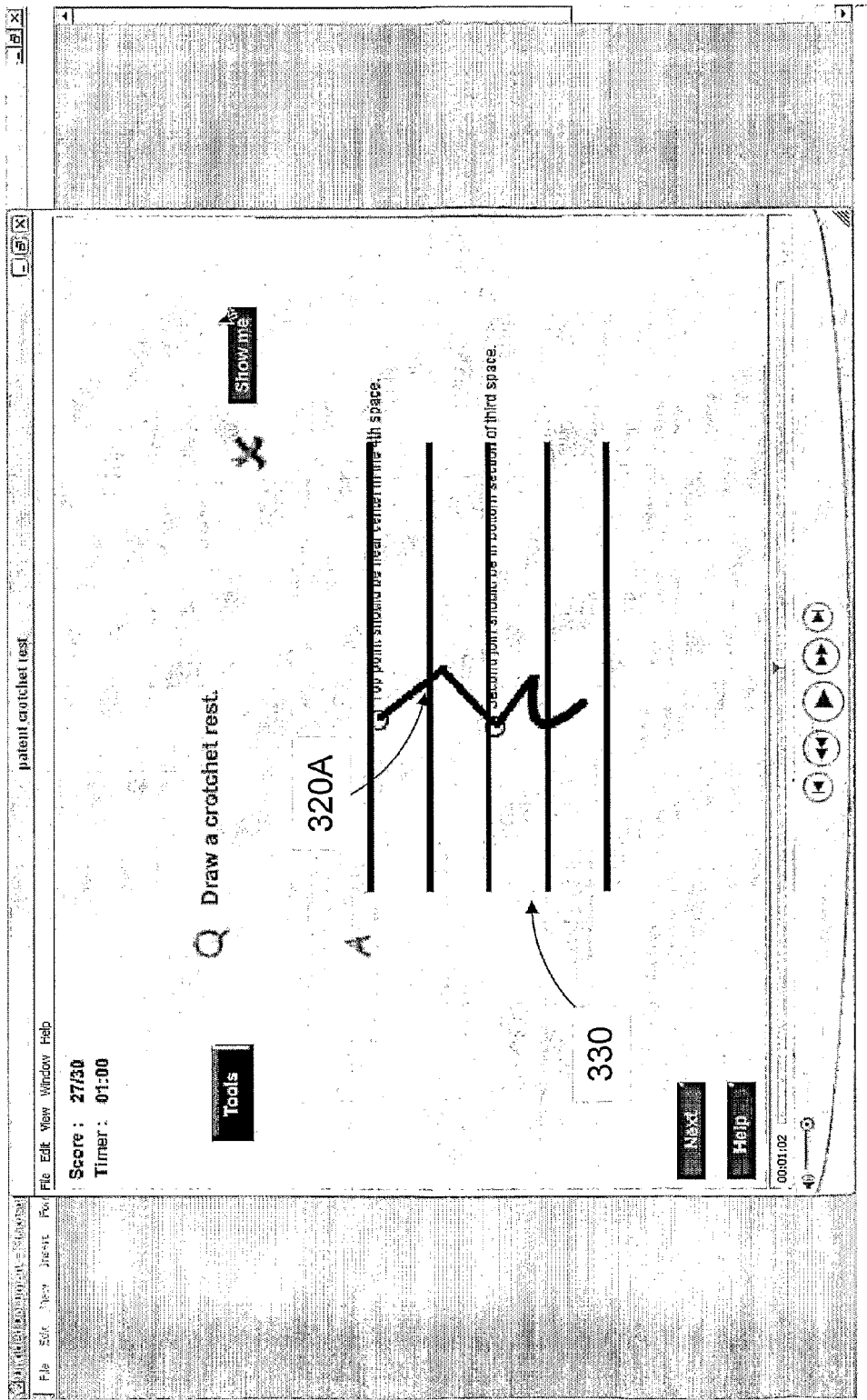

Referring to FIGS. 3-5, the screenshots shows embodiments of the present invention teaching and examining the drawing of musical notation in the form of a crotchet rest by a user and the marking of the user's work. The user is presented with a musical task, which in this example is to "Draw a crotchet rest". The user selects the "draw line" icon 300 from the drop down menu 310 on the screen and draws three individual lines 320 with the input device 120, such as a mouse, on the staff 330 provided on the screen. FIG. 3 shows two of the lines 320 that have been drawn. The user then selects the "add hook" icon 340 from the drop down menu 310 and uses a drag and drop method to add the hook 400 shown in FIG. 4 to the end of the third line 320C to produce the crotchet rest. The user can adjust the beginning or start points, end points and the shape of the hook with the input device 120.

Pressing the marking button 350 informs the user as to whether the crotchet rest has been drawn correctly, which it has been in the example shown in FIG. 4. The software checks characteristics of the elements of musical notation including the angles, beginning and end points of each line 320, the intersection points of each line and the beginning and end positions of the hook 400 by comparing the characteristics of the elements of musical notation with corresponding predetermined thresholds. The software checks the beginning point of the top line 320A of the crotchet rest and the direction of the top line. An example of suitable program code components for performing this function follow:

```
on checkline1
  --sprite(4).top – sprite(81).top+20 < 9 top point first line correctly placed
  if abs(sprite(4).top – sprite(81).top+24.5) < 9 and
  sprite(81).member.linedirection = 0 then append (answerList, "a")
end
```

The software checks the beginning point of the second line 320B where it joins to the end of the first line 320A of the crotchet rest and the direction of the second line 320B. An example of suitable program code components for performing this function follow:

```
on checkline2
    --2nd joint in right spot
    if abs(sprite(4).top − sprite(82).top+61.25) < 9 and
    sprite(82).member.linedirection = 1   then append (answerList,   "b")
end
```

The software checks the beginning point of the third line 320C where it joins to the end of the second line 320B of the crotchet rest and the direction of the third line. An example of suitable program code components for performing this function follow:

```
on checkline3
    --3rd joint in right spot
    if abs(sprite(4).top − sprite(83).top+85.75) < 9 and
    sprite(83).member.linedirection = 0   then append (answerList,   "c")
end
```

The software checks the beginning point of the hook 400 where it joins the third line 320C of the crotchet rest and the direction of the hook. An example of suitable program code components for performing this function follow:

```
on checkline4
    --4th joint in right spot
    if abs(sprite(4).top − sprite(83).bottom+134.75) < 9 and
    sprite(83).member.linedirection = 0   then append (answerList, "d")
end
```

The software checks the end point of the hook 400 where it finishes at the bottom of the staff 300 on the screen. An example of suitable program code components for performing this function follow:

```
on checkhook
    if sprite(112).puppet = false then exit
    if sprite(83).member.linedirection = 0 then a = 3
    if sprite(83).member.linedirection = 1 then a = 4
    dx = sprite(112).loch − sprite(83).quad[a].loch
    dy = sprite(112).locv − sprite(83).quad[a].locv
    ans = sqrt (power(dx,2) + power(dy,2) )
    dx1 = sprite(113).loch − sprite(83).quad[a].loch
    dy1 = sprite(113).locv − sprite(83).quad[a].locv
    ans1 = sqrt (power(dx1,2) + power(dy1,2) )
    if ans1 > ans then b = 113
    if ans1 < ans then b = 112
    if abs(sprite(4).top − sprite(b).locv +171.5) < 9 then append
    (answerList, "f")
end
```

The software checks the length of each line 320A, 320B, 320C, the vertical alignment of the beginning point of the first line 320A and the end point of second line 320B, the vertical alignment of the beginning point of the second line 320B and the end point of the third line 320C, the vertical alignment of the beginning point of the hook and the end point of hook 400. The software also checks the angle of each line. If the angle of each line is correct, a tick appears on the screen, as shown in FIG. 4. Conversely, if the angle of between the lines are incorrect, the comment "_____ line too wide." or "_____ line too narrow." appears on the screen. An example of suitable program code components for performing these functions is as follows:

```
on checkangleline3
    if sprite(83).member.linedirection = 0 then
        dx= sprite(83).quad[1].loch − sprite(83).quad[3].loch
        dy = sprite(83).quad[1].locv − sprite(83).quad[3].locv
        a= atan ( float(dy) /float (dx)) * 180 /pi
        put a
    end if
    if sprite(83).member.linedirection = 1 then
        dx= sprite(83).quad[2].loch − sprite(83).quad[4].loch
        dy = sprite(83).quad[2].locv − sprite(83).quad[4].locv
        a= atan (   float(dy)   /float (dx)) * 180 /pi
        put a
    end if
    if sprite(83).member.linedirection = 0   and abs (a −45) < 10 then
    append (answerList, "k")
    if sprite(83).member.linedirection = 0   and a −45 < −10 then
    member("commentI").text = member("commentI").text &&"Bottom
    line too wide."
    if sprite(83).member.linedirection = 0 and a −45 > 10 then
    member("commentI").text =member("commentI").text && "Bottom
    line too narrow."
end
```

As shown in FIG. 5, elements of the crotchet rest that have been drawn incorrectly by the user are highlighted after marking has been requested to provide immediate feedback to the user thus enabling the user to learn from their mistakes. In the example in FIG. 5, the user is informed that the beginning of the first line 320A should be near the centre in the 4$^{th}$ space of the staff 330 and the second join between the second and third lines 320B, 320C should be in the bottom section of the third space.

Figure 6:
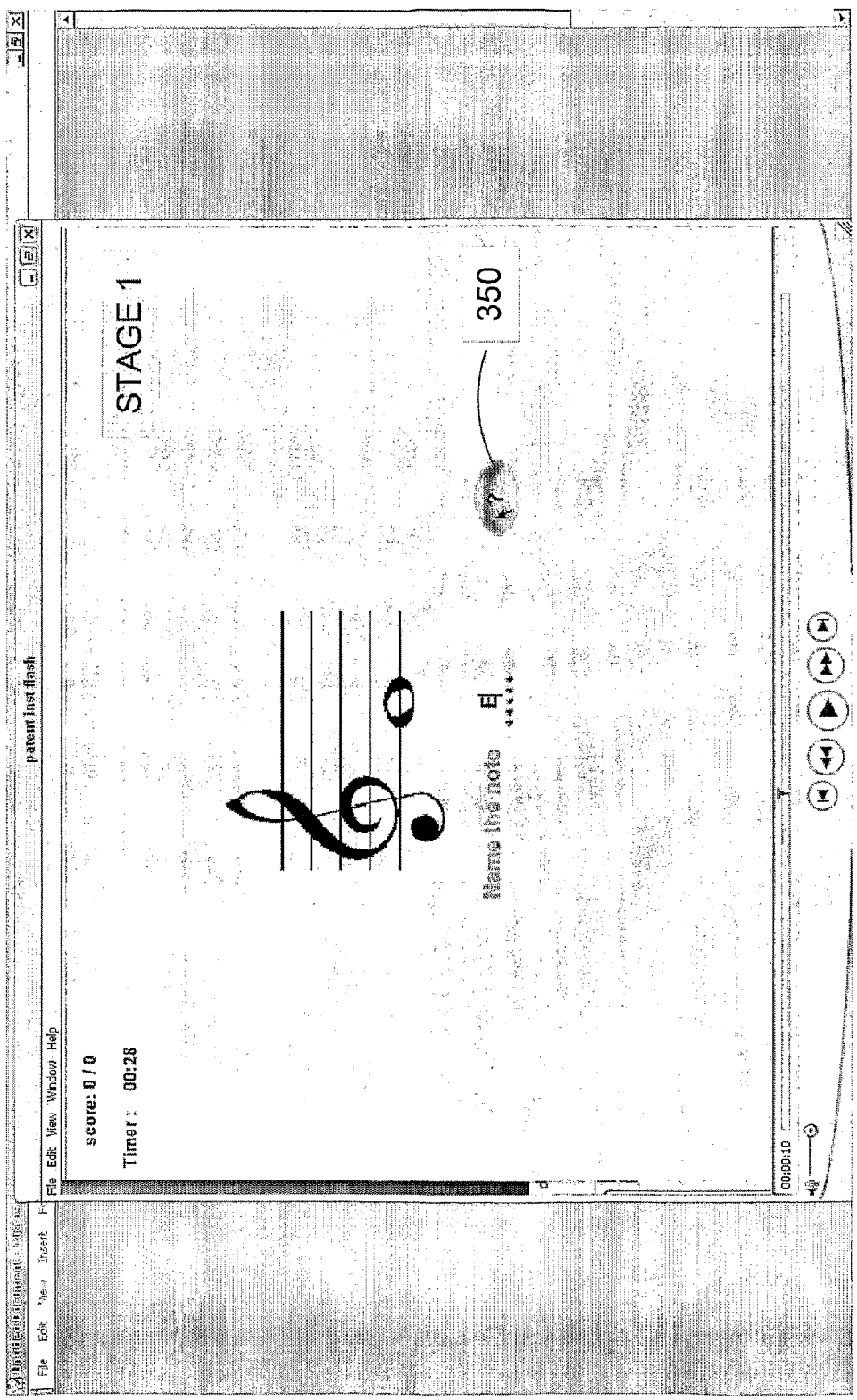
FIG. 6 is a screenshot illustrating examining a user on the naming of a note.
Figure 7:
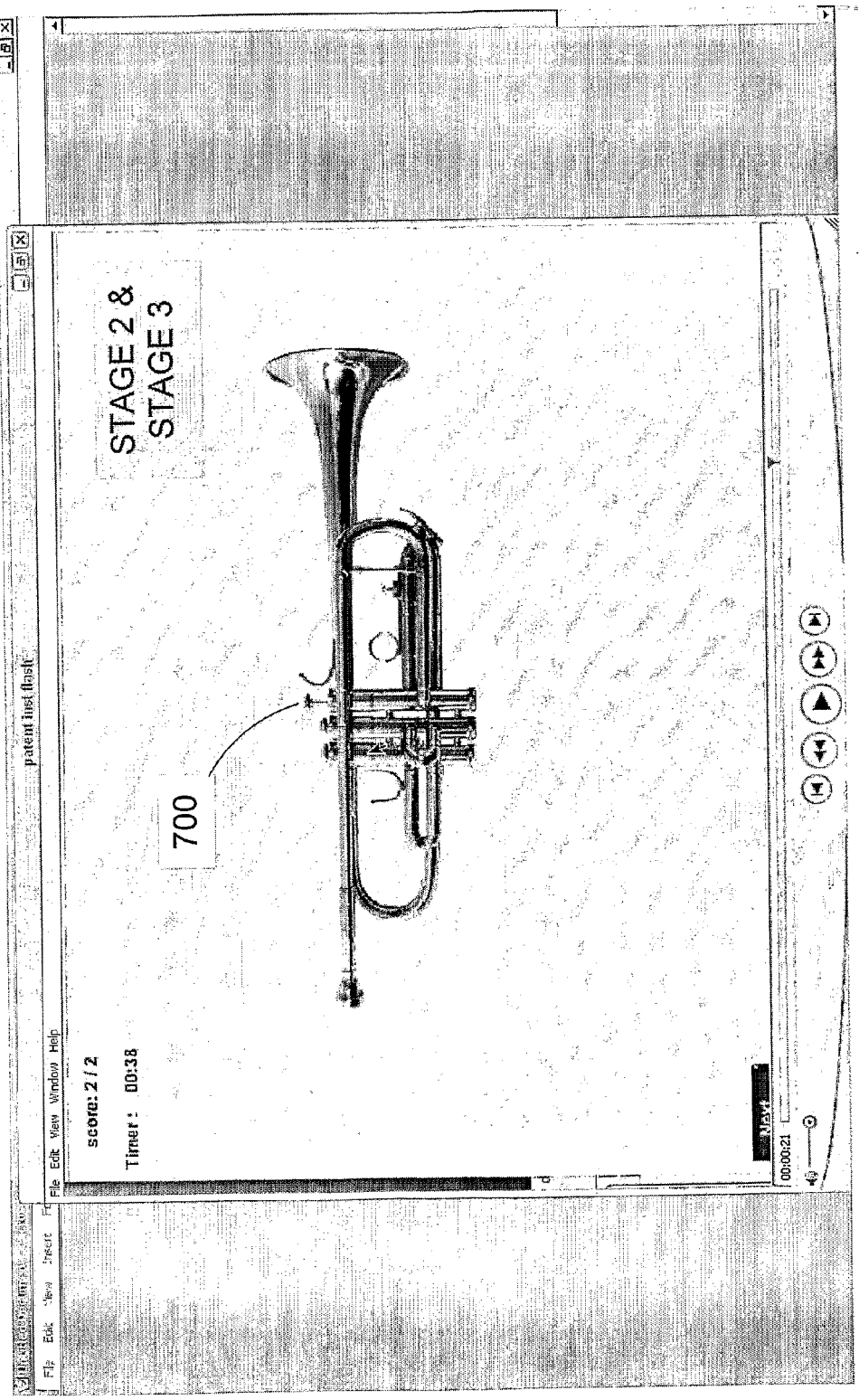
FIG. 7 is a screenshot illustrating examining a user on the playing of the note in FIG. 6 visually and aurally.

FIGS. 6 and 7 relate to a two-stage musical task where the user must name the note displayed in stage 1 and select appropriate keys, valves, buttons etc. of an instrument in stage 2. Upon the user requesting marking by selecting the question mark icon 350, the user is informed whether their answer is correct or incorrect. According to one embodiment, if the user is correct they receive a point and move to stage 2. If the user is incorrect they loose a point and repeat the question until they are correct.

With reference to FIG. 7, an image of an instrument chosen by the user appears on screen in stage 2. The user has to click on all the correct keys, e.g. for a piano, or valves 700 for the trumpet shown in FIG. 7, for the note from stage 1, to be played on that instrument. For every incorrect key, valve or button chosen, the user looses a point. When the user selects the correct keys, valves etc., they move to stage 3.

In stage 3, an animation of the instrument playing the note, visually and aurally, is displayed and played to the user. The user then selects the next button and an instrumental music flash program randomly selects a note and the process is repeated again. According to some embodiments, when all the notes have been selected, the user's results are transmitted to the database 150 where the user's progress can be monitored, for example, by a tutor. Monitoring can occur in real time as the user conducts the lesson or examination or at a later stage. Instrumental music flash can be used for all musical instruments and is used to correlate the recognition of the name of the note, fingers used to play the note and the pitch of the note.

Figure 8:
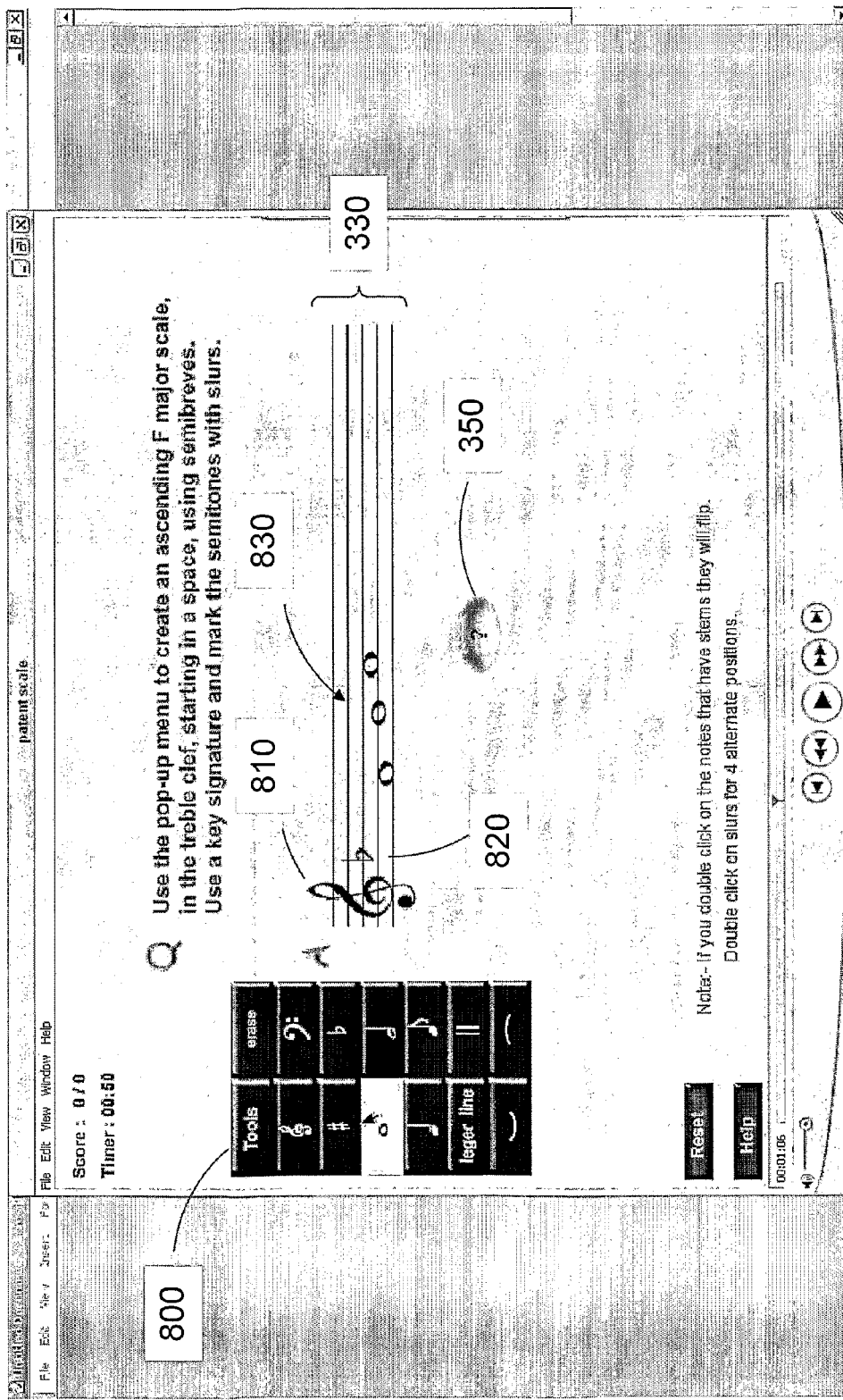
FIGS. 8 and 9 are screenshots illustrating examining and marking a user on musical tasks requiring the drawing of multiple musical notation elements.
Figure 9:
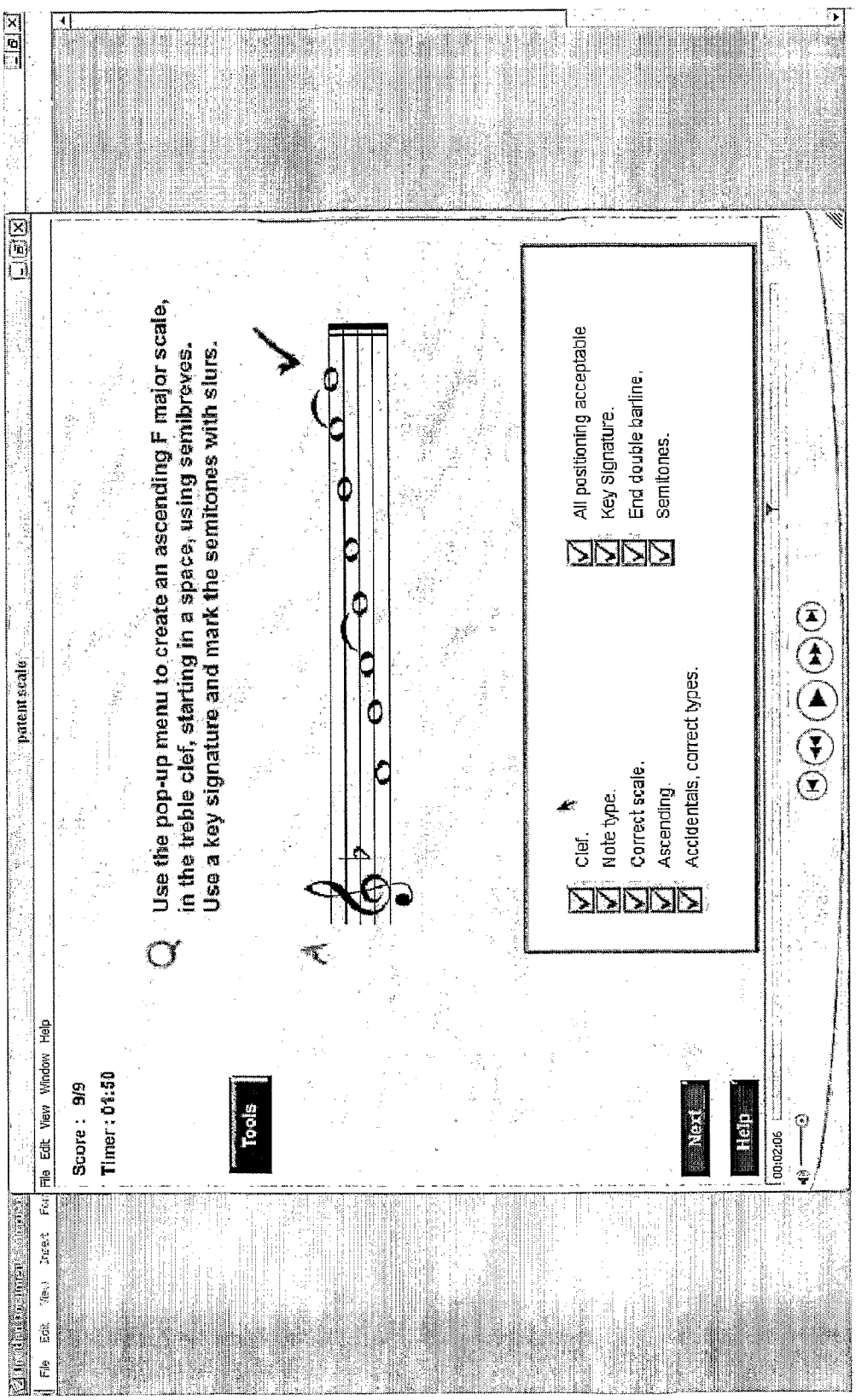

With reference to FIGS. 8 and 9, multiple elements of musical notation will be used in, for example, scales, transpositions, interval, melody writing, writing harmony, and in any musical exercise where more than one musical symbol needs to be checked. In this example, the musical task requires the user to create an ascending F major scale using semibreves.

The user selects the appropriate clef from the clef popup menu within the drop down menu 800 and places it on the staff 330 displayed on the screen using the drop and drag method. The user then selects the appropriate "draw line" and/or "draw curve" icons from the clef menu using the drop and drag method followed by the note heads. The user then selects the "draw curve line" icon from the articulation popup menu within the drop down menu to draw a slur and uses the input device 120 to draw the slur in the appropriate place. The user selects the "draw stem" icon from the drop down menu and draws the stems in the appropriate place using the input device 120. The user selects the "end bar line" icon from the drop down menu and uses the drop and drag method to place the end bar line in the appropriate place. These elements of musical notation can be selected in any order and when complete, the user selects the 'marking' button 350 to effect marking of the task and check if the question has been answered correctly. The screenshot in FIG. 8 shows the treble clef 810, a flat symbol 820 and three note heads 830 already drawn.

To mark the user's answer, the software sorts the note heads 830 in order from left to right as they appear in the staff 330 on the screen. This prepares the notes to be checked to verify whether the correct notes have been used. In other embodiments, the notes could be sorted in order from right to left. Suitable program code components for performing this function follow:

```
on sorthorizontal
   notesH=[ ]
   notesV=[ ]
   memberlist =[ ]
   repeat with sp in barnote
      if sprite(sp).puppet = 1 then append ( notesH, sprite(sp.locH)
      if sprite(sp).puppet = 1 then append (notesV, sprite(sp).locv)
      if sprite(sp).puppet = 1 then append (memberlist, sprite(sp).member)
   end repeat
   repeat with sp in barnote
      if sprite(sp).puppet = 1 then sprite(sp).locH = min (notesH)
      if sprite(sp).puppet = 1 then sprite(sp).locv = getat (notesV, getpos (notesH,min (notesH)))
      if sprite(sp).puppet = 1 then sprite(sp).member = getat (memberlist, getpos (notesH,min (notesH)))
      if sprite(sp).puppet = 1 then a = getpos (notesH,min (notesH))
      if sprite(sp).puppet = 1 then deleteat (notesH, a)
      if sprite(sp).puppet = 1 then deleteat (notesV, a)
      if sprite(sp).puppet = 1 then deleteat (memberlist, a)
   end repeat
   updatestage
end
```

The software then finds all the stems used with, for example, the follow code:

```
on makestemlist
   stemsprite = [ ]
   repeat with sp = 131 to 140
      if sprite sp intersects 41 then append (stemsprite, sp)
   end repeat
end
```

The software sorts the stems in order from left to right as they appear in the staff 330 on the screen. This prepares the stems to be associated with the equivalent note head, so each note can be marked as correct or incorrect. Suitable program code components for performing this function follow:

```
on sorthorizontalstems
   linesH=[ ]
   linesV=[ ]
   sizeline = [ ]
   memberlist =[ ]
   repeat with sp in stemsprite
      if sprite(sp).puppet <> 0 then append ( linesH, sprite(sp).locH)
      if sprite(sp).puppet <> 0 then append (linesV, sprite(sp).rect)
      if sprite(sp).puppet <> 0 then append (sizeline, sprite(sp).linesize)
      if sprite(sp).puppet <> 0 then append (memberlist, sprite(sp).member)
   end repeat
   repeat with sp in stemsprite
      if sprite(sp).puppet <> 0 then sprite(sp).locH = min (linesH)
      if sprite(sp).puppet <> 0 then sprite(sp).rect = getat (linesV, getpos (linesH,min (linesH)))
      if sprite(sp).puppet <> 0 then sprite(sp).linesize = getat (sizeline, getpos (linesH,min (linesH)))
      if sprite (sp).puppet <> 0 then sprite(sp).member = getat (memberlist, getpos (linesH,min (linesH)))
      if sprite(sp).puppet <> 0 then a = getpos (linesH,min (linesH))
      if sprite(sp).puppet <> 0 then deleteat (linesH, a)
      if sprite(sp).puppet <> 0 then deleteat (linesV, a)
      if sprite(sp).puppet <> 0 then deleteat (sizeline, a)
      if sprite(sp).puppet <> 0 then deleteat (memberlist, a)
   end repeat
   updatestage
end
```

The software checks whether the notes are in the correct position and whether the correct spacing between the notes has been used by comparing these characteristics with predetermined thresholds for the respective characteristics of the elements of musical notation. Suitable program code components for performing this function follow:

```
on checkbassnotes
   SpriteStaffNo = 2
   notesinlistLtoR = [ ]
   repeat with k = 0 to span
      n = startsprite + k
      if     sprite(n).loch > sprite(SpriteStaffNo).left and sprite(n).loch < sprite(SpriteStaffNo).right and abs(sprite(SpriteStaffNo).rect[4] - sprite(n).locv – 36 ) <2 then notesinhistLtoR.append("g3")
      if     sprite(n).loch > sprite(SpriteStaffNo).left and sprite(n).loch < sprite(SpriteStaffNo).right and abs(sprite(SpriteStaffNo).rect[4] - sprite(n).locv – 30 ) <2 then notesinlistLtoR.append("f3")
      if     sprite(n).loch > sprite(SpriteStaffNo).left and sprite(n).loch < sprite(SpriteStaffNo).right and abs(sprite(SpriteStaffNo).rect[4] - sprite(n).locv– 24 ) < 2 then notesinlistLtoR.append("e3")
      if     sprite(n).loch > sprite(SpriteStaffNo).left and sprite(n).loch < sprite(SpriteStaffNo).right and abs(sprite(SpriteStaffNo).rect[4] - sprite(n).locv – 18 ) < 2 then notesinlistLtoR.append("d3")
      if     sprite(n).loch > sprite(SpriteStaffNo).left and sprite(n).loch < sprite(SpriteStaffNo).right and abs(sprite(SpriteStaffNo).rect[4] - sprite(n).locv –12 ) < 2 then notesinlistLtoR.append("c3")
      if     sprite(n).loch > sprite(SpriteStaffNo).left and sprite(n).loch < sprite(SpriteStaffNo).right and abs(sprite(SpriteStaffNo).rect[4] - sprite(n).locv – 6 ) < 2 then notesinlistLtoR.append("b2")
      if     sprite(n).loch > sprite(SpriteStaffNo).left and sprite(SpriteStaffNo).right and sprite(n).member <> member 10 of castLib 1 and abs(sprite(SpriteStaffNo).rect[4] - sprite(n).locv ) < 2 then notesinlistLtoR.append("a2")
      if     sprite(n).loch > sprite(SpriteStaffNo).left and sprite(n).loch < sprite(SpriteStaffNo).right and abs(sprite(SpriteStaffNo).rect[4] - sprite(n).locv +6 ) < 2 then notesinlistLtoR.append("g2")
      if     sprite(n).loch > sprite(SpriteStaffNo).left and sprite(n).loch < sprite(SpriteStaffNo).right and abs(sprite(SpriteStaffNo).rect[4] - sprite(n).locv +12 ) < 2 then notesinlistLtoR.append("f2")
   end repeat
end
```

The software checks for any accidental used as stated in drawing sharps, flats and naturals elsewhere in this document. The software checks for any other variables in a multi symbol question. All the above checks must be deemed correct within the thresholds of the software for the question using multiple symbols to be correct. Marks are added to the running total for each element of musical notation or characteristic thereof that the software checks and which is within the thresholds to be marked correct. In FIG. 9, all the tasks were correctly completed by the user.

Figure 10:
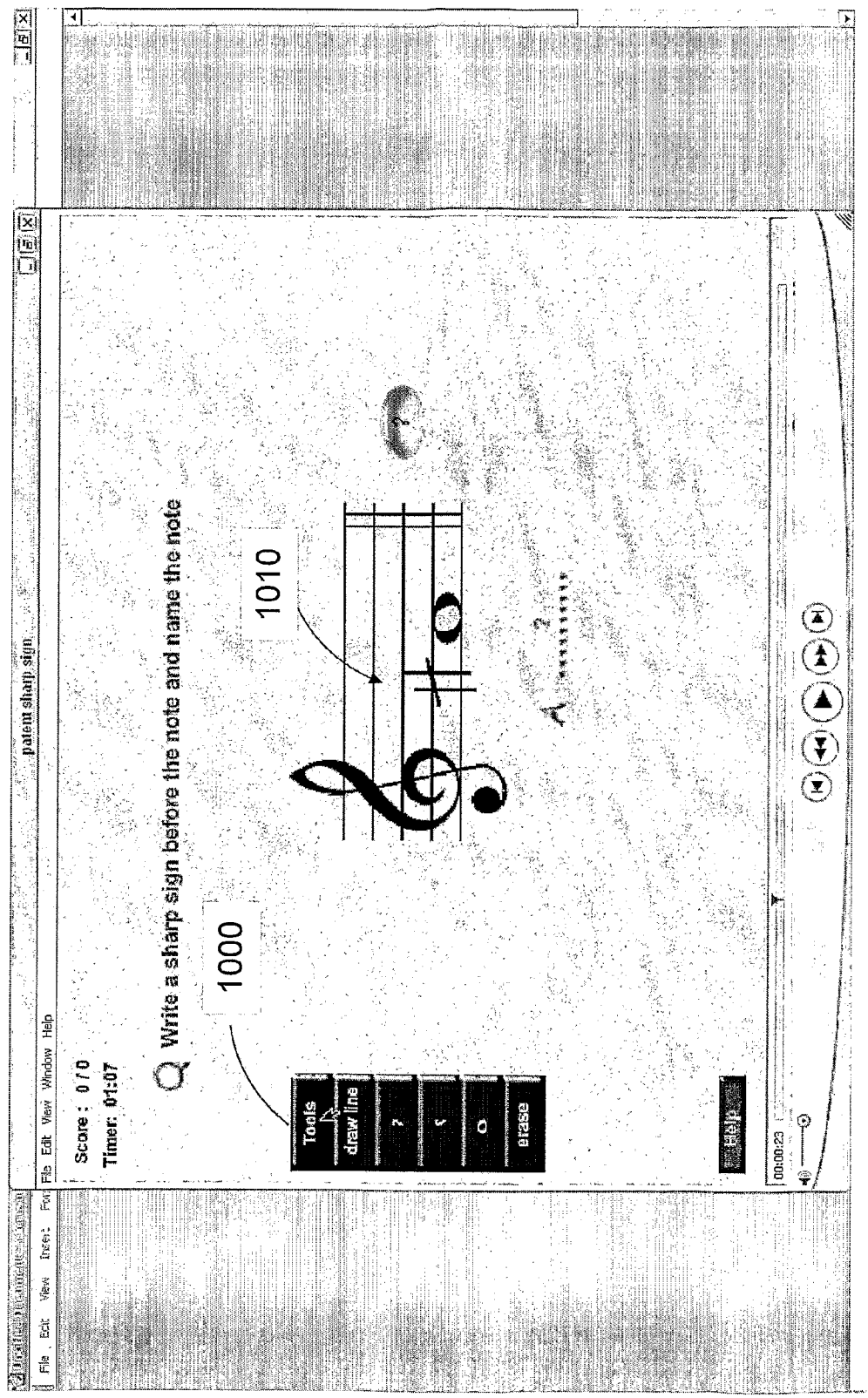
FIGS. 10-12 are screenshots illustrating examining and marking a user on the drawing of a sharp sign.
Figure 11:
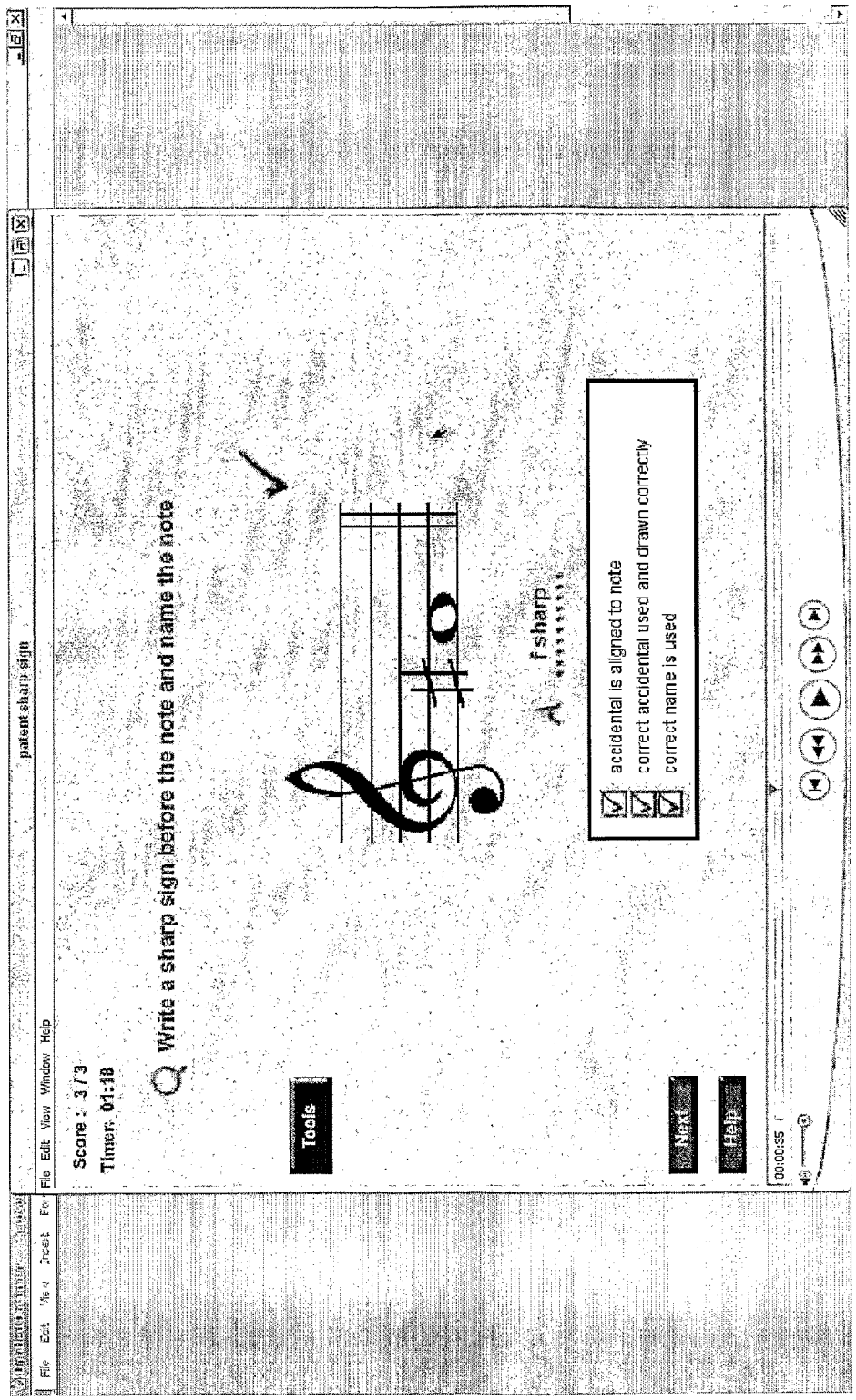
Figure 12:
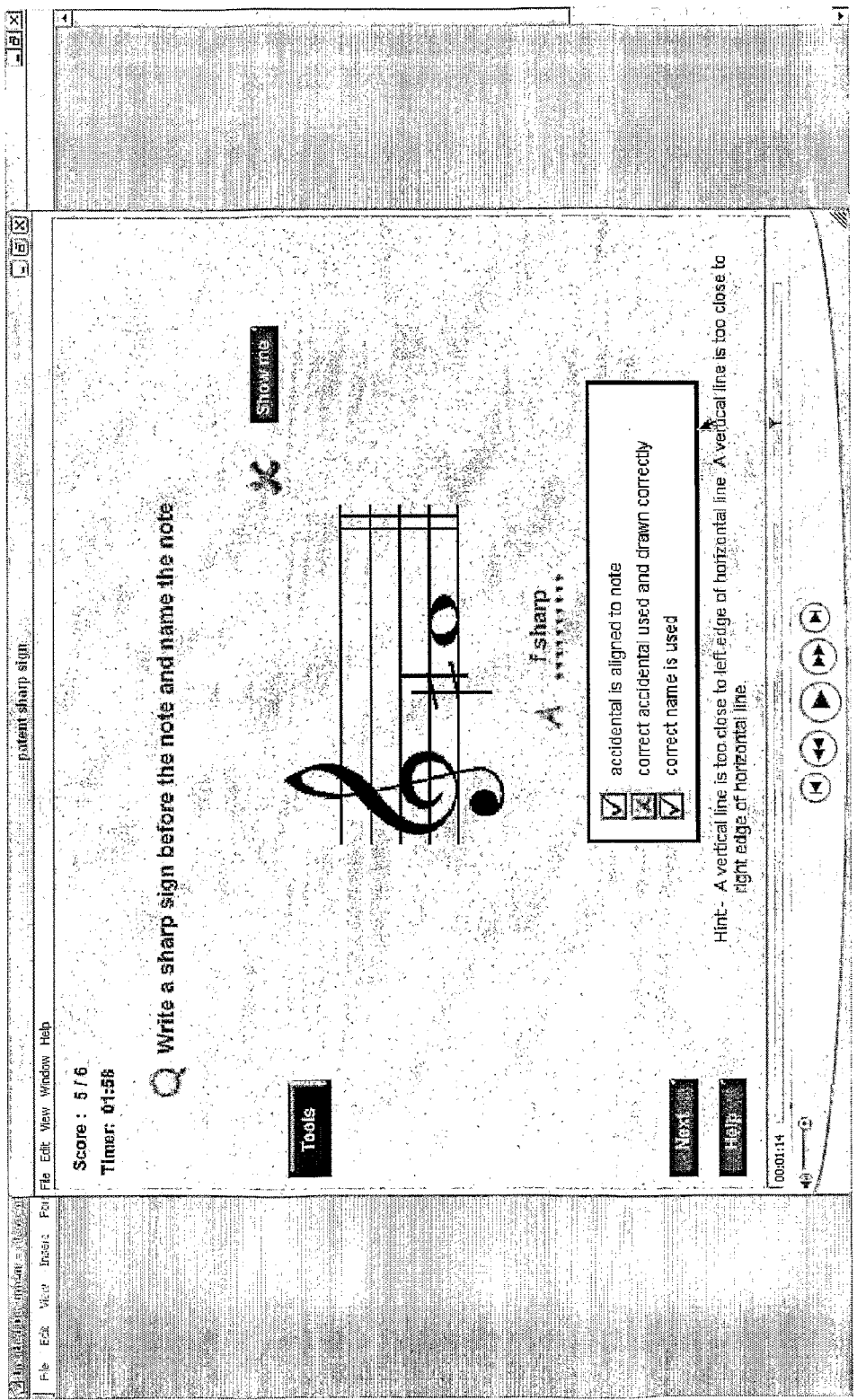

FIGS. 10-12 are screenshots illustrating teaching and marking the drawing of a sharp sign. FIG. 10 shows the menu 1000 used to draw the sharp sign 1010, which is partially drawn in FIG. 10. FIG. 11 shows the completed task in which all the measured characteristics of the elements of musical notation have been drawn and positioned correctly. Each of the assessed characteristics is shown, which include verifying that the accidental is aligned to the note, the correct accidental has been used and drawn correctly and the note and the accidental have been named correctly. FIG. 12 shows the measured characteristics of the elements of musical notation that have been drawn correctly and incorrectly. Whilst the accidental is aligned to the note and the note has been named correctly, the accidentals are not drawn correctly. Hints can also be provided to educate the user where they made mistakes. Hence, feedback to the student is immediate and they can improve on their earlier performance.

Figure 13:
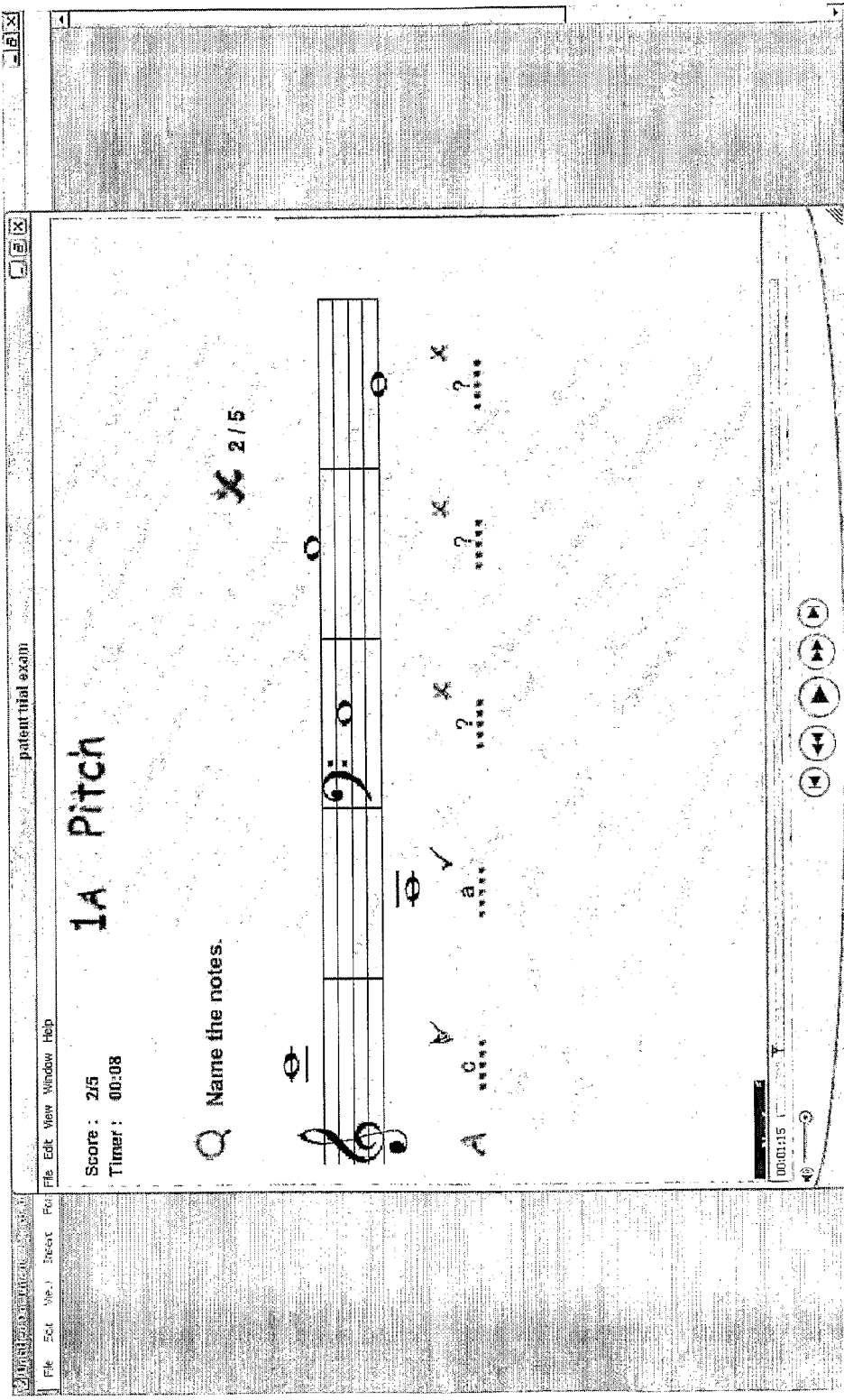
Figure 14:
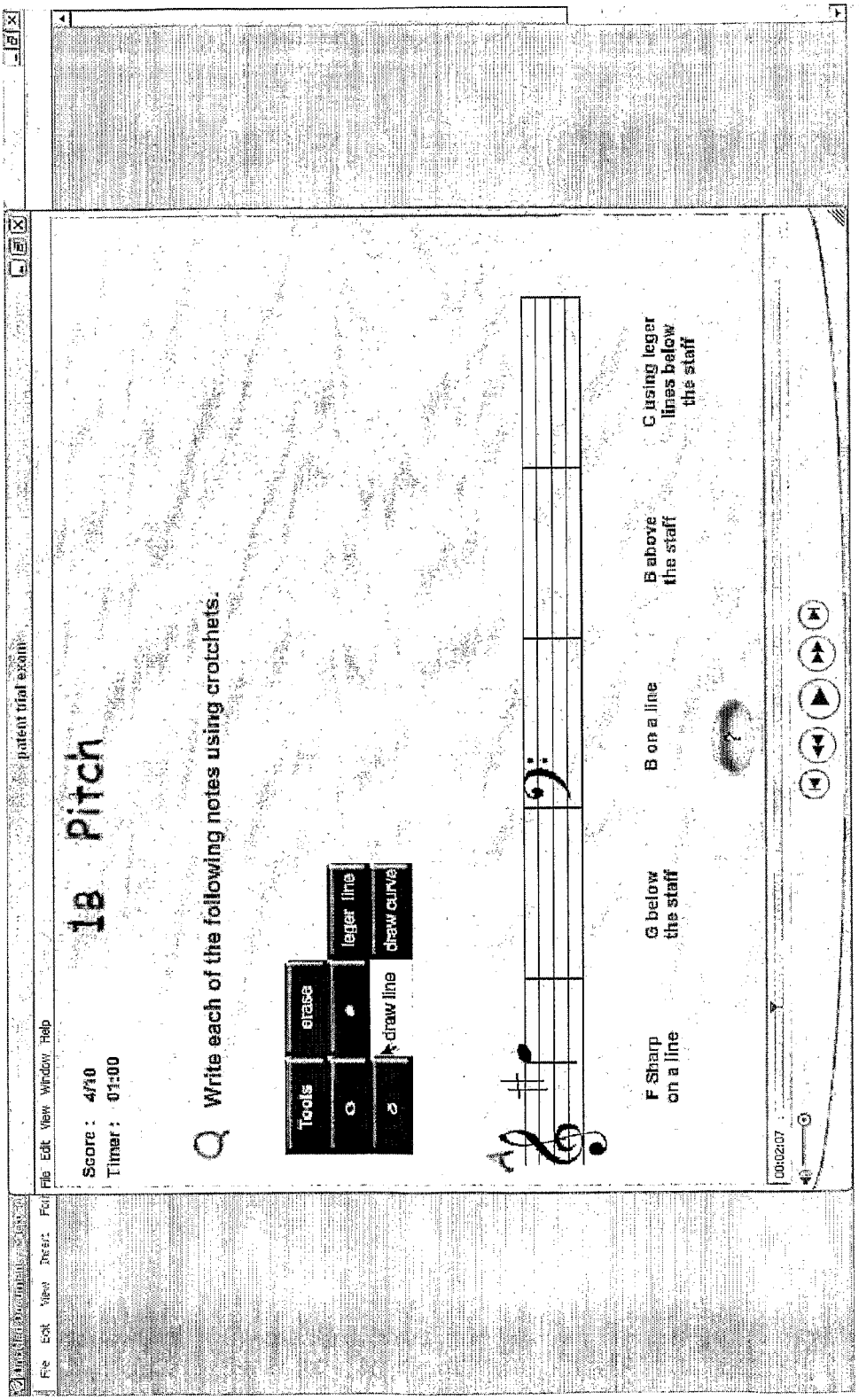
Figure 15:
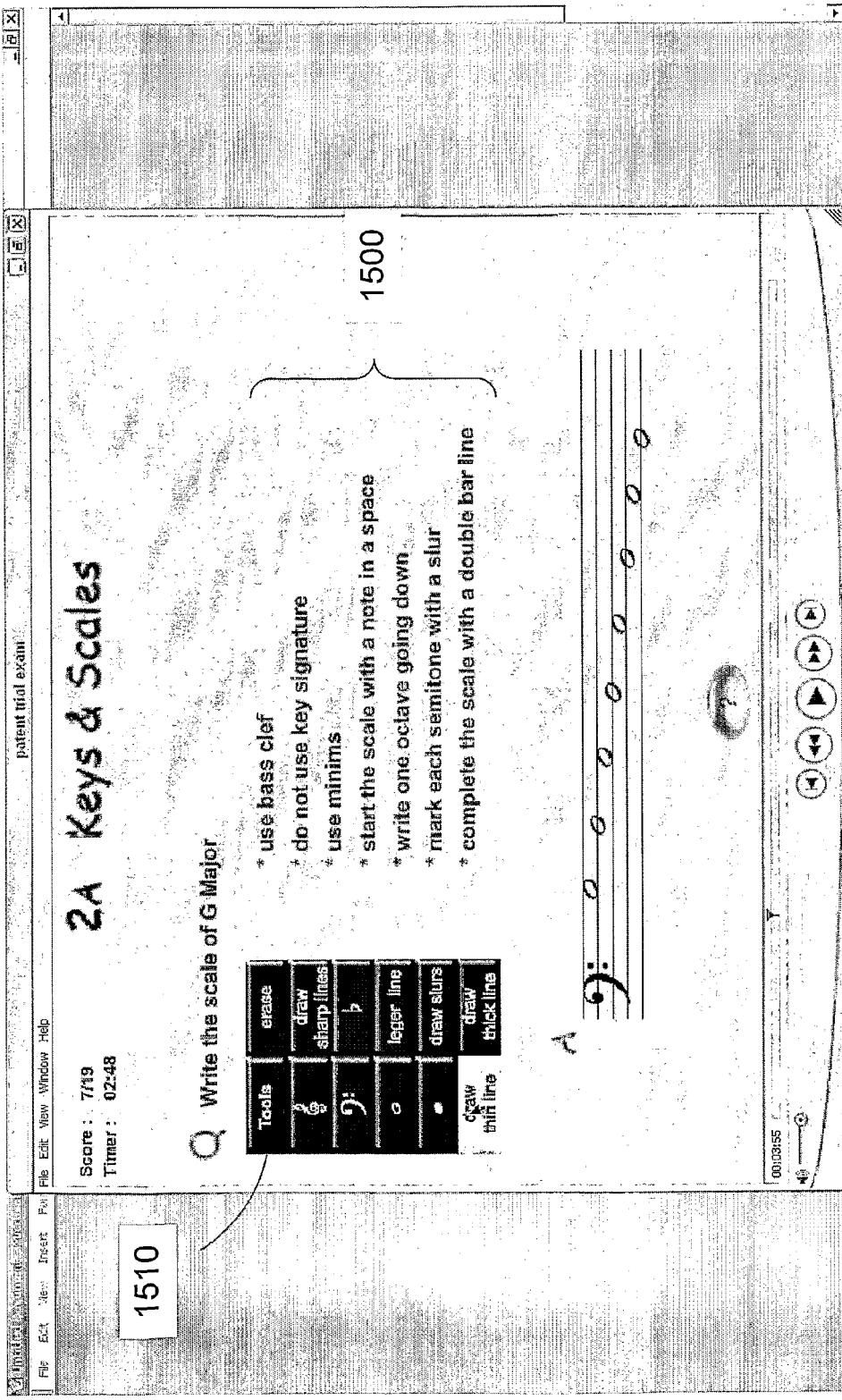
Figure 16:
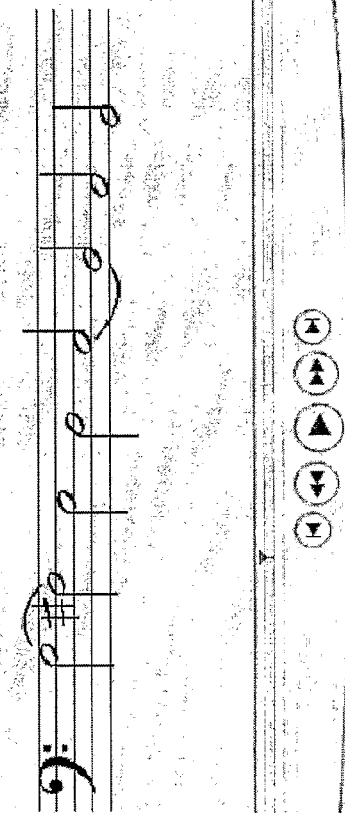
Figure 17:
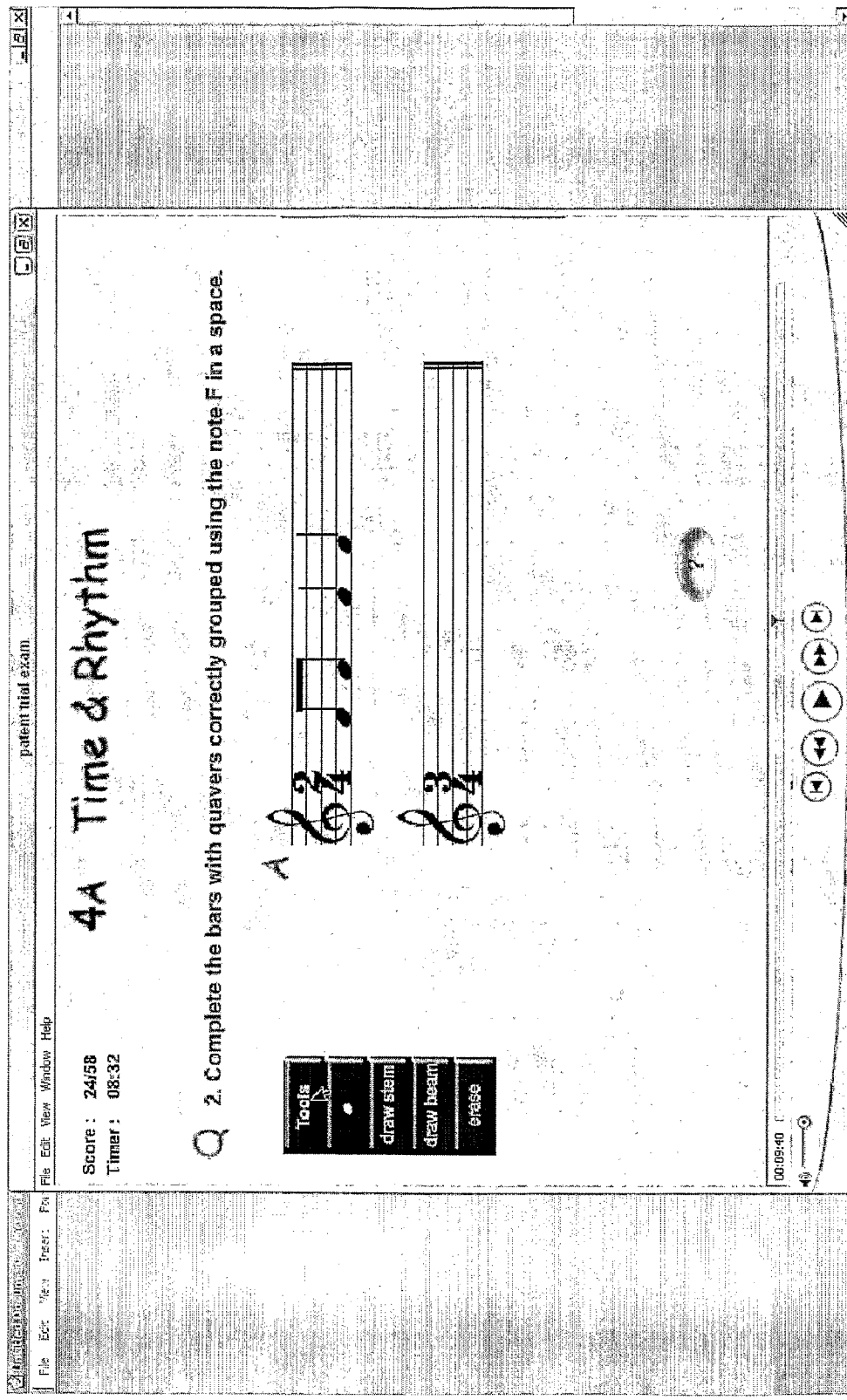
Figure 18:
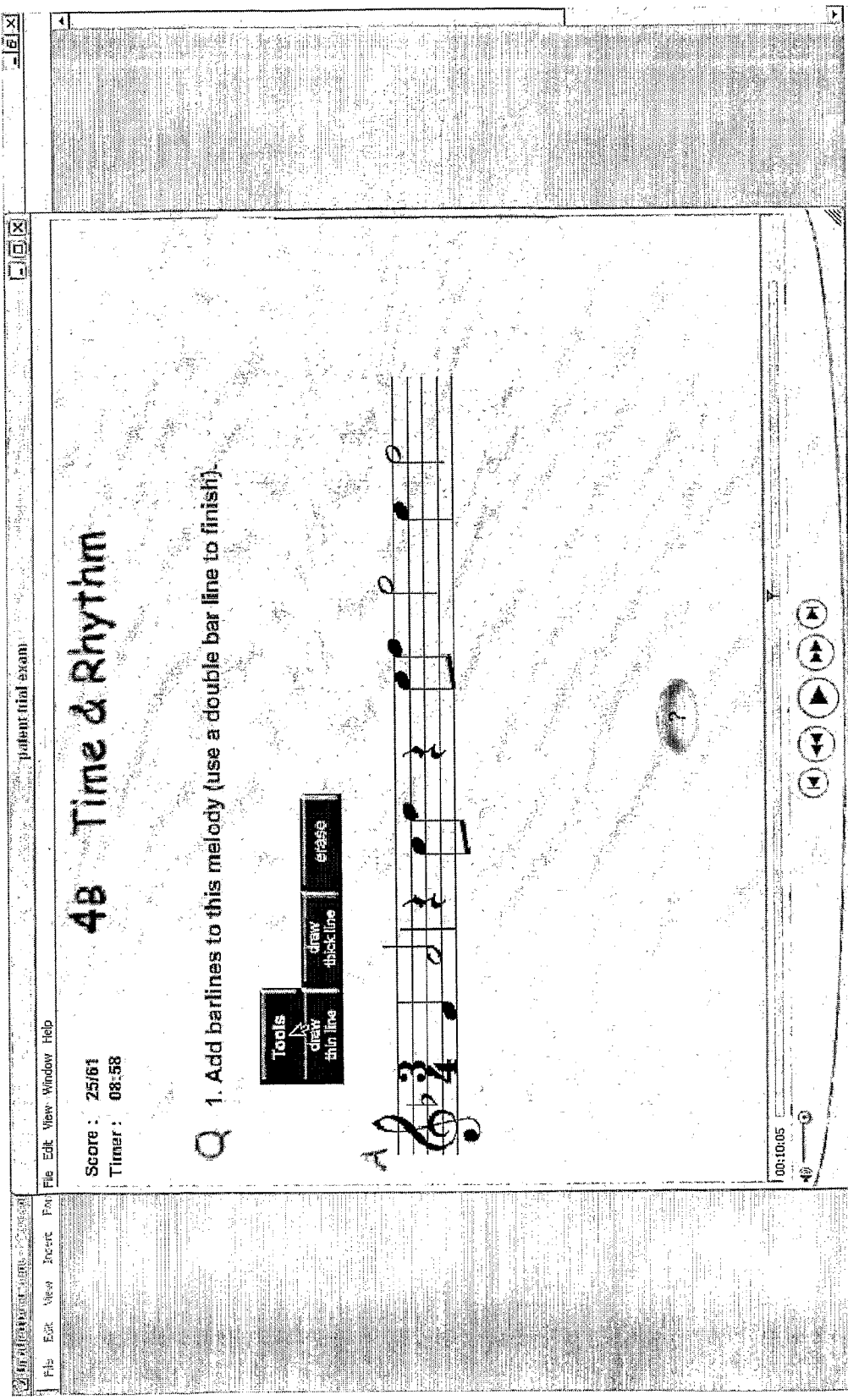
Figure 19:
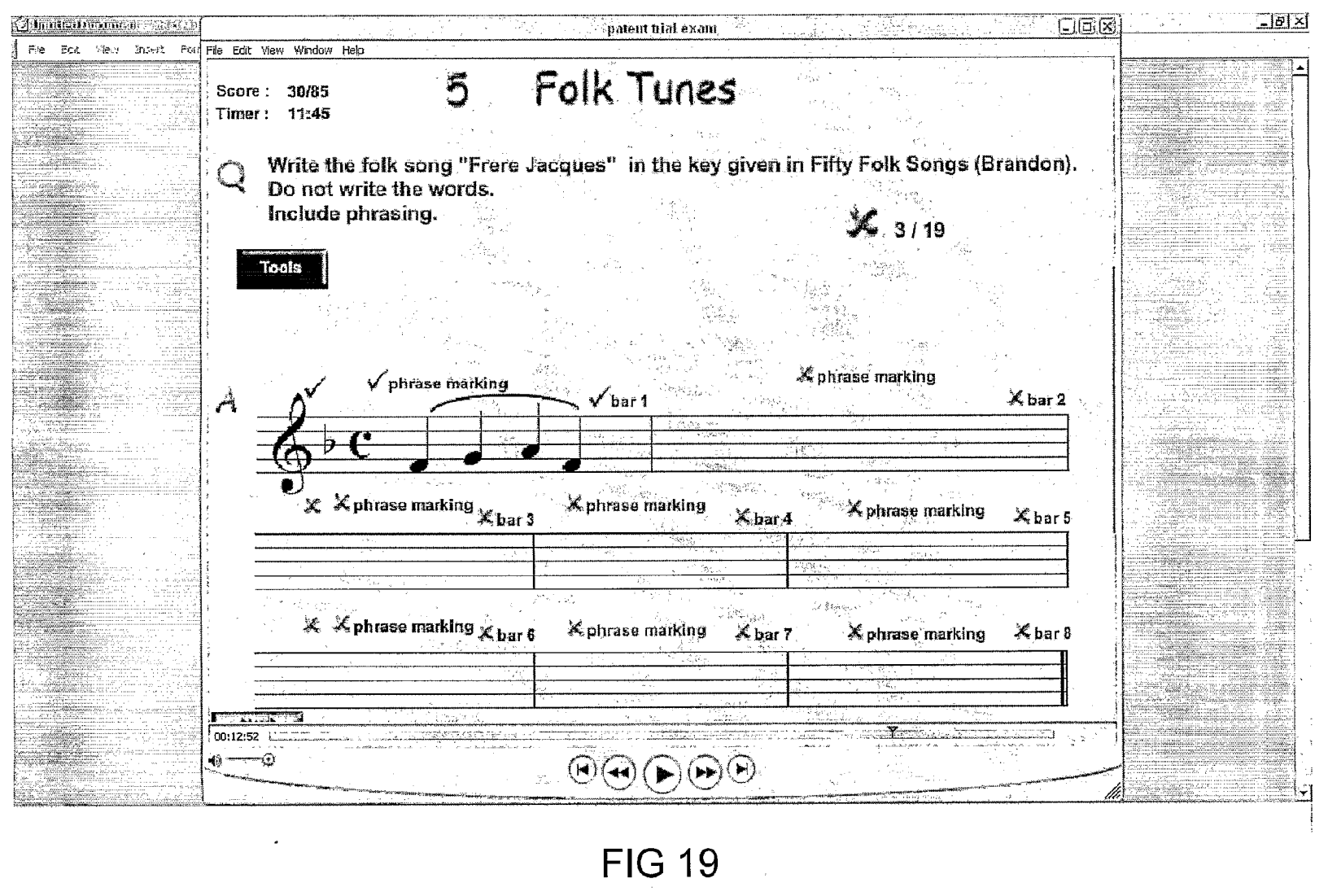
Figure 20:
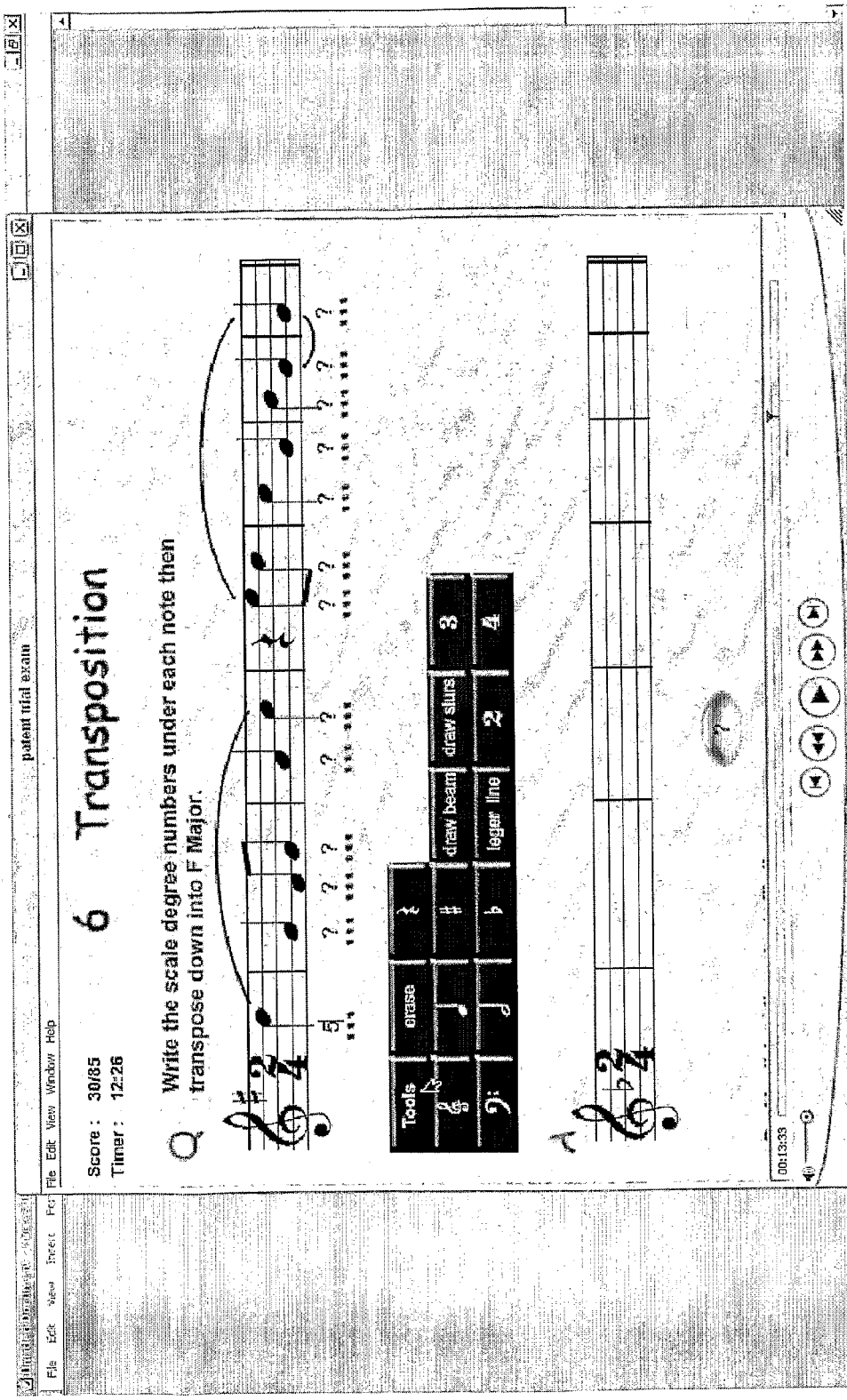
Figure 21:
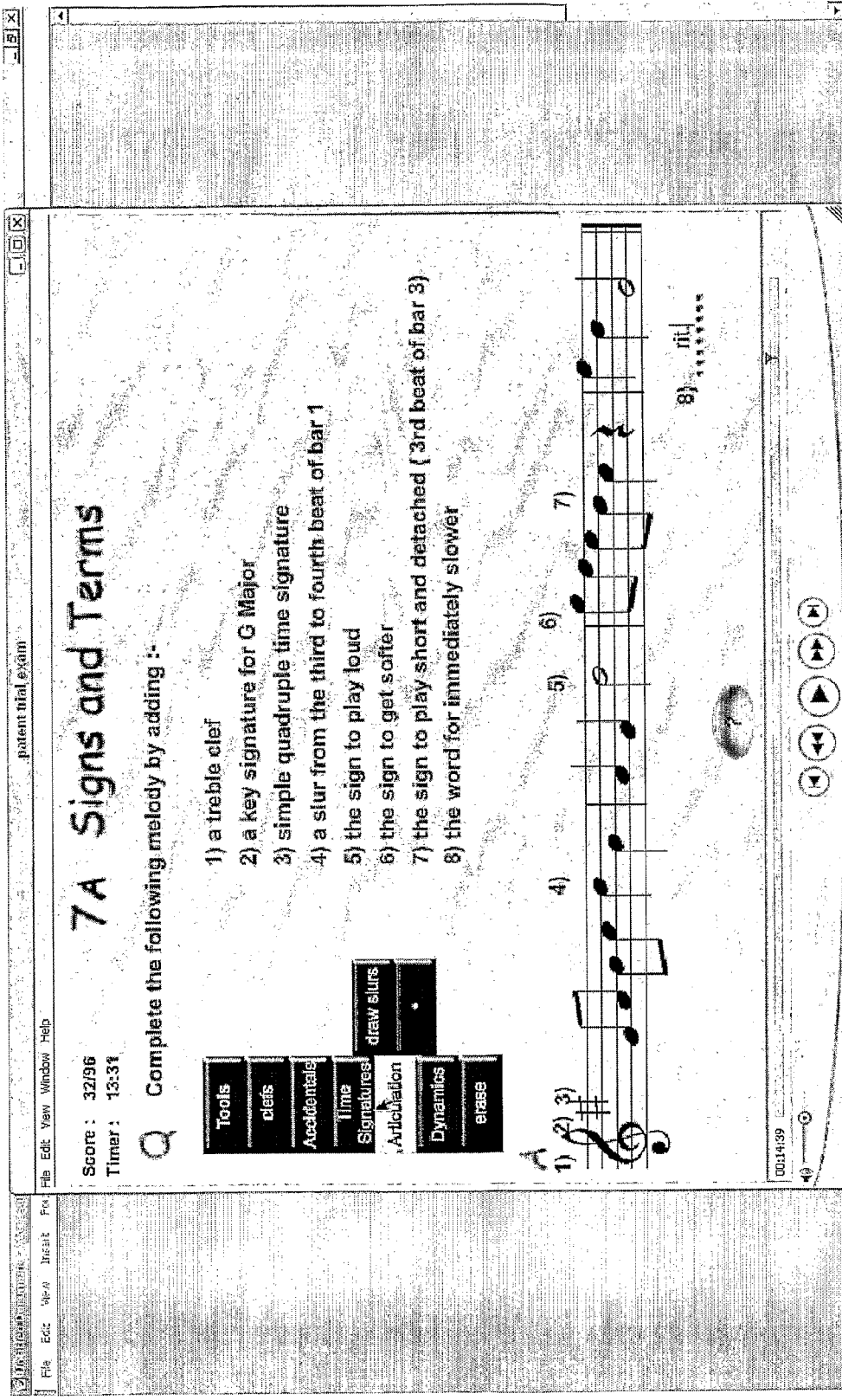

FIGS. 13-21 show further screenshots illustrating embodiments of the present invention teaching and examining musical tasks to be completed by users as exercises and/or examination questions. For example, FIG. 13 shows a musical task in which the user must name the notes as part of a pitch exercise, whereas in FIG. 14, the user must draw the notes using crotchets. An example of program code components that enable the user to draw the elements of musical notation for these examples follows:

FIGS. 15 and 16 illustrate a keys and scales task in which the scale of G Major must be drawn according to the instructions 1500 displayed. The menu 1510 is shown in FIG. 15 providing all the icons necessary to complete the musical task and the result of marking is shown in FIG. 16. In this example, the user did not complete the scale with a double bar line and their mark is 9/10. Time and rhythm tasks are shown in FIGS. 17 and 18 and in the task shown in FIG. 19 a folk song memorised by the user must be written according to the instructions. A transposition task is shown in FIG. 20 and signs and terms are tested in FIG. 21. For each task, the appropriate menu is displayed, with sub-menus where required, to enable the user to draw the musical notation using elements thereof or to enable the user to insert the required musical notation depending on the aspect of music theory being taught and/or examined.

Embodiments of the present invention also enable users to draw flat signs 820, an example of which is shown in FIG. 8. The user draws a line with the input device 120 onto the music staff 330 provided on the screen by selecting the 'draw line' icon from the drop down menu. The user draws a curved line with the input device 120 onto the music staff attaching it to the straight line already drawn by selecting the 'draw curve line' from the drop down menu on the screen. When complete, the user selects the 'marking' button 350 to see if the flat has been assembled correctly.

The software checks the angle, position and size of the flat sign 820 in relation to the staff 330 and the note on the staff, by comparison with predetermined thresholds. The horizontal position of the flat sign is determined by its left-right relation to the staff. If its position is incorrect, an on-screen message appears, alerting the user to the error. The software checks that only one line has been drawn, suitable program code components for which are as follows:

```
--check for stems in bar 1
    stemsprite = [ ]
    repeat with r = 131 to 159
        if sprite r intersects 41 then append (stemsprite, r)
    end repeat
    --check only one line for flat
    if stemsprite.count<>1 then
        markcross
        exit
    end if
```

The software checks the angle of the line that has been drawn. If the line of the flat is at the correct angle, a tick appears on the screen. Conversely, if the line of the flat is at an incorrect angle, the comment "flat stem is straight" appears on the screen, suitable program code components for which are as follows:

```
if sprite(flatlinesp).width > 7 then
    markcross
    exit
end if
```

The software checks the length of the flat line that has been drawn. If the line of the flat is the correct length, a tick appears on the screen. Conversely, if the line of the flat is not the correct length, the comment "flat stem length is incorrect length" appears on the screen effected by the following suitable program code components:

```
if abs(sprite(flatlinesp).height – 31 ) > 6 then
    markcross
    exit
end if
put "flat stem is incorrect length"
```

The software then finds the end points of the flat curve and checks where they intersect the straight line of the flat. If the curve line intersects the straight line, a tick appears on the screen. Conversely, if one or both points of the curved line of the flat do not intersect the straight line, a cross appears on the screen effected by the following suitable program code components:

```
--find endpoints of curve
flatpoints = [ ]
repeat with r in [191,193,194,196]
    if sprite r intersects 41 then append (flatpoints, r)
end repeat
if flatpoints.count <> 2 then
    markcross
    exit
end if
put "2 points"
if sprite(flatpoints[1]).locv > sprite(flatpoints[2]).locv then
    topcurvept = flatpoints[2]
    bottomcurvept =flatpoints[1]
else
    topcurvept = flatpoints[1]
    bottomcurvept =flatpoints[2]
end if
--check bottom end of flat stem = 18
if abs(sprite(flatlinesp).bottom - sprite(2).bottom +14) > 4 then
    markcross
    exit
```

-continued

```
    end if
    put "bottom correct"
    --top of flat curve lines up with 32
    if abs(sprite(topcurvept).top - sprite(2).bottom +32) > 4 then
        markcross
        exit
    end if
        put "top correct"
    --bottom flat curve to bottom flat stem
    if sprite(flatlinesp).member.linedirection = 0 then
        if abs(sprite(flatlinesp).quad[3].locv - sprite(bottomcurvept).locv) > 4
  or abs(sprite(flatlinesp).quad[3].loch - sprite(bottomcurvept).loch) > 4 then
            markcross
            exit
        end if
    end if
    if sprite(flatlinesp).member.linedirection = 1 then
        if abs(sprite(flatlinesp).quad[4].locv - sprite(bottomcurvept).locv) > 4
  or abs(sprite(flatlinesp).quad[4].loch - sprite(bottomcurvept).loch) > 4 then
            markcross
            exit
        end if
    end if
    --top of curve meets stem of flat
    if abs(sprite(flatlinesp).right - sprite(topcurvept).loch) > 4 then
        markcross
        exit
    end if
```

The software then checks the spacing from the note to the closest horizontal line. If the space between the horizontal lines and the note are correct, a tick and associated comment appear on the screen. Conversely, if the space between the horizontal lines and the note is incorrect, the comment "Accidental is too close to note" or "Accidental is too far from note" appears on the screen. All the above checks must be deemed correct within the predetermined thresholds of the software for the drawing of the flat sign 820 to be correct. Marks are added to the score for each element the software checks.

The present invention also enables users to draw natural signs. The user draws four individual lines with the input device 120 onto the music staff 330 provided on the screen. The user selects the 'draw line' icon from the drop down menu on the screen and draws four lines with the input device 120, two horizontal lines and two vertical lines. These lines can be drawn in any order and when complete, the user selects the 'marking' button 350 to see if the natural sign has been drawn correctly. The software checks the angle, horizontal and vertical position of the natural sign in relation to the staff and the note on the staff, using predetermined parameters. The horizontal position of the natural sign is determined by its left-right relation to the staff. If its position is incorrect, an on-screen message appears, alerting the user to the error. This can be effected by the following suitable program code components:

```
on spacingfromnote
    -- check space between note & both vertical lines, check if either line is
too close the note
    if sprite(6).loch - (sprite(verticals[1]).loch or sprite(verticals[2]).loch)
< 26 then member("comment").text = member("comment").text &
" Accidental is too close to note"
    if (sprite(verticals[1]).loch or sprite(verticals[2]).loch) - sprite(6).loch
> 65 then member("comment").text = member("comment").text &
" Accidental is too far from note"
end
```

The software differentiates lines by recognising their horizontal and vertical location on the staff 330. The software checks that the correct four lines have been drawn. If the correct number of lines have been drawn, a tick and the comment "correct number of lines" appears on the screen. Conversely, if the number of lines drawn is incorrect, the comment "Note wrong number of lines" appears on the screen. This can be effected by the following suitable program code components:

```
on checknumberoflines
    listall = [ ]
    repeat with n = 1 to 10
        if sprite(100+n).puppet <> 0 then append(listall, n)
    end repeat
    if listall.count <> 4 then totallywrong
    if listall.count <> 4 then member("comment").text = "Used wrong
number of lines. "
    if listall.count <> 4 then pass
end
```

The software differentiates lines by horizontal and vertical location on the staff 330. It first determines the vertical lines by virtue of the following exemplary program code components:

```
on findverticals
    verticals = [ ]
    note = 100
    repeat with t = 1 to 4
        if sprite(note + t).right - sprite(note + t).left <20 then append
(verticals, note+t)
    end repeat
    put verticals & "vertical list"
end
```

It then determines the horizontal lines by virtue of the following exemplary program code components:

```
on findhorizontals
    horizontals = [ ]
    note = 100
    repeat with u = 1 to 4
        if sprite(note + u).right - sprite(note + u).left >20 then append
(horizontals, note+u)
    end repeat
    put horizontals & "horizontals list"
end
```

The software checks the vertical placement of the natural sign. It determines whether the natural sign is too low or too high on the staff 330 relative to the placement of the note on the staff on the screen. If the natural sign is drawn in the correct vertical position on the staff, a tick and a comment appears on the screen. Conversely, if the natural sign is not drawn in the correct vertical position on the staff, the comment "natural is not vertically aligned with note" appears on the screen by virtue of the following exemplary program code components:

```
on checkrelativitynatural
    -- check box one answer
    -- check that the natural is not too high or too low
    if abs(((sprite(101).locv + sprite(102).locv + sprite(103).locv +
sprite(104).locv) /4) - (sprite(6).locv - 7))<15 then
        member("comment").text = member("comment").text & ""
        check1right
```

```
        else
            member("comment").text = member("comment").text & "
            natural is not
vertically aligned with note, "
            check1wrong
        end if
end
```

The software then determines the spacing between the vertical lines. If the space between the vertical lines are correct, a tick and the comment "vertical lines correctly spaced" appears on the screen. Conversely, if the space between the vertical lines is incorrect, the comment "Vertical lines of natural are too far apart." or "Vertical lines of natural are too close together." appears on the screen by virtue of the following exemplary program code components:

```
on spacingofverticals
    if abs (sprite(verticals[1]).loch – sprite(verticals[2]).loch ) > 30 then member("comment").text = member("comment").text & " Vertical lines of natural are too far apart."
    if abs (sprite(verticals[1]).loch – sprite(verticals[2]).loch ) < 8 then member("comment").text = member("comment").text & " Vertical lines of natural are too far apart."
end
```

The software then determines the spacing between the horizontal lines. If the space between the horizontal lines are correct, a tick and the comment "horizontal lines correctly spaced" appears on the screen. Conversely, if the space between the horizontal lines is incorrect, the comment "Horizontal lines of natural are too far apart." or "Horizontal lines of natural are too close together." appears on the screen by virtue of the following exemplary program code components:

```
on spacingofhorizontals
    if abs (sprite(horizontals[1]).locv – sprite(horizontals[2]).locv ) > 28 then member("comment").text = member("comment").text & " Horizontal lines of natural are too far apart."
    if abs (sprite(horizontals[1]).locv – sprite(horizontals[2]).locv ) <10 then member("comment").text = member("comment").text & " Horizontal lines of natural are too close together."
end
```

The software then checks the spacing from the note to the closest horizontal line. If the space between the horizontal lines and the note are correct, a tick and a suitable comment appears on the screen. Conversely, if the space between the horizontal lines and the note is incorrect, the comment "Accidental is too close to note" or "Accidental is too far from note" appears on the screen by virtue of the following exemplary program code components:

```
on spacingfromnote
    if sprite(6).loch – (sprite(verticals[1]).loch or sprite(verticals[2]).loch) < 28 then member("comment").text = member("comment").text & " Accidental is too close to note"
    if (sprite(verticals[1]).loch or sprite(verticals[2]).loch) – sprite(6).loch > 65 then member("comment").text = member("comment").text & " Accidental is too far from note"
end
```

The software then checks the angle of the horizontal lines. If the horizontal lines and the note are at an acceptable angle, i.e. within a predetermined threshold a tick and a suitable comment appears on the screen. Conversely, if the angle between the horizontal lines and the note is incorrect, the comment "One or more of the horizontals lines are drawn down and not drawn angled up." appears on the screen by virtue of the following exemplary program code components:

```
on checkhorizontalangleup
    put sprite(horizontals[1]).quad[2].locv
    put sprite(horizontals[1]).quad[4].locv
    if (sprite(horizontals[1]).quad[2].locv > sprite(horizontals[1]).quad[4].locv) or (sprite(horizontals[2]).quad[2].locv > sprite(horizontals[2]).quad[4].locv) then member("comment").text = member("comment").text & " One or more of the horizontals lines are drawn down and not drawn angled up."
end
```

The software then determines the length of the vertical lines. If the length of the vertical lines is correct, a tick and a suitable comment appears on the screen. Conversely, if the length of the vertical lines is incorrect, the comment "One or both of the vertical lines is too long." or "One or both of the vertical lines is too short." appears on the screen by virtue of the following exemplary program code components:

```
on checklengthverticals
    if sprite(verticals[1]).height >70 or sprite(verticals[2]).height >70 then member("comment").text = member("comment").text & " One or both of the vertical lines is too long."
    if sprite(verticals[1]).height < 31 or sprite(verticals[2]).height< 31 then member("comment").text = member("comment").text & " One or both of the vertical lines is too short."
end
```

The software then determines the length of the horizontal lines. If the length of the horizontal lines is correct, a tick and a suitable comment appears on the screen. Conversely, if the length of the horizontal lines is incorrect, the comment "One or both of the horizontal lines is too long." or "One or both of the horizontal lines is too short." appears on the screen by virtue of the following exemplary program code components:

```
on checklengthhorizontals
    if sprite(horizontals[1]).width >64 or sprite(horizontals[2]).width >64 then member("comment").text = member("comment").text & " One or both of the horizontal lines is too long."
    if sprite(horizontals[1]).width <20 or sprite(horizontals[2]).width <20 then member("comment").text = member("comment").text & " One or both of the horizontal lines is too short."
end
```

The software then determines the correct angle of the first horizontal line. If the angle of the first horizontal line is correct, a tick and a suitable comment appears on the screen. Conversely, if the angle of the first horizontal line is incorrect, the comment "First line is drawn wrong." appears on the screen by virtue of the following exemplary program code components:

```
on checkfirstline
    --start and finish of left line
    --must start note.bottom and finish note.top + note.height
```

```
        if sprite(verticals[1]).loch < sprite(verticals[2]).loch then a =
verticals[1]
        if sprite(verticals[1]).loch > sprite(verticals[2]).loch then a =
verticals[2]
            put a &&"a"
            if abs (sprite(a).bottom – sprite(6).bottom ) < 6 then nothing  --and
abs (sprite(6).top –sprite(a).top – sprite(6).height ) < 20
                else member("comment").text = member("comment").text &
" Secconed line is drawn wrong."
end
```

The software then determines the correct angle of the second horizontal line. If the angle of the second horizontal line is correct, a tick and a suitable comment appears on the screen. Conversely, if the length of the horizontal lines is incorrect, the comment "Second line is drawn wrong." appears on the screen by virtue of the following exemplary program code components:

```
on checksecondline
        if sprite(verticals[1]).loch < sprite(verticals[2]).loch then a =
verticals[2]
        if sprite(verticals[1]).loch > sprite(verticals[2]).loch then a =
verticals[1]
            put a &&"a"
            if abs (sprite(a).top – sprite(6).top ) < 6 then nothing
                else member("comment").text = member("comment").text &
" second line is drawn wrong."
        end
```

The software then determines the ratio between the length of the vertical lines compared to the length of the horizontal lines. If the ratio between the length of the vertical and horizontal lines are correct, i.e. within a predetermined threshold, a tick and the comment "lines correctly spaced" appears on the screen. Conversely, if the ratio between the length of the vertical and horizontal lines is incorrect, the comment "width too wide compared to height." appears on the screen by virtue of the following exemplary program code components:

```
on checkHeightLengthRatio
        if sprite(horizontals[1]).width < (0.6 * sprite(verticals[1]).height) and
sprite(horizontals[2]).width < (0.6 * sprite(verticals[2]).height) then
nothing
            else member("comment").text = member("comment").text & "width
too wide compared to height."
End
```

The software then determines the intersection of the vertical and horizontal lines. If the intersection of the vertical and horizontal lines are correct, i.e. within a predetermined threshold, a tick and a suitable comment appears on the screen. Conversely, if the ratio between the length of the vertical and horizontal lines is incorrect, the comment "incorrect joins." appears on the screen by virtue of the following exemplary program code components:

```
on checkallcorners
    --a is left line
    --b is top line
    if sprite(verticals[1]).loch < sprite(verticals[2]).loch then
        a = verticals[1]
        b = verticals[2]
    end if
    if sprite(verticals[1]).loch > sprite(verticals[2]).loch then
        a = verticals[2]
        b = verticals[1]
    end if
    if sprite(horizontals[1]).locv < sprite(horizontals[2]).locv then
        c = horizontals[1]
        d = horizontals[2]
    end if
    if sprite(horizontals[1]).locv > sprite(horizontals[2]).locv then
        c = horizontals[2]
        d = horizontals[1]
    end if
    --conditionA
    if abs( sprite(a).bottom – sprite(d).bottom) < 5 and   abs(
sprite(c).left – sprite(a).left) < 5    and    abs( sprite(d).left –
sprite(a).left) < 5    and    abs(sprite(c).top – sprite(b).top) < 5 and    abs(
sprite(d).right – sprite(b).left) < 5    and    abs( sprite(c).right –
sprite(b).left) < 5 then nothing
        else member("comment").text = member("comment").text &
" incorrect joins."
end
```

According to some embodiments, all the above checks must be deemed correct within the thresholds of the software for the drawing of the natural to be marked correct. Marks are added to the score for each element the software checks.

Figure 22:
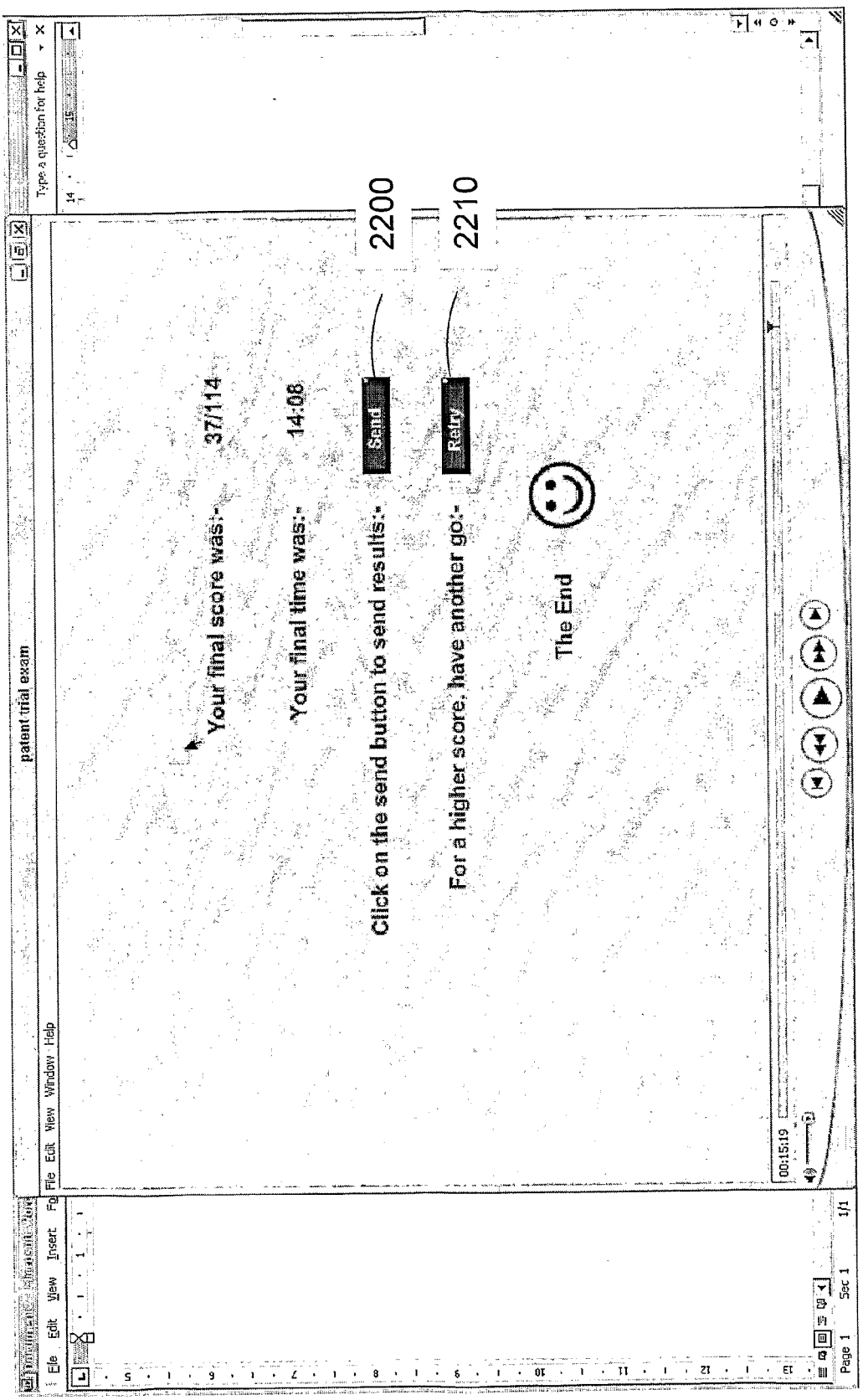
FIG. 22 is a screenshot showing the display when a user has completed a lesson, exercise or practice examination.

According to one embodiment, an online examination comprises multiple questions of the type described above. A user inputs an identifier, such as their name and a password, which is matched to their name and password stored in the storage facility 150. If the name and password combination is correct, the user proceeds to the examination, otherwise the name and password need to be re-entered. Buttons to direct the user to the individual exam questions are displayed in the main menu. The user clicks on the question they wish to answer and the software moves to that question. The user can return to the main menu at any time. The user answers questions in any order and can return to any question at any time during the examination. At the end of the examination the user presses a send button 2200 as shown in FIG. 22. The software marks each question and sends the results and a copy of the user's answers to the database 150. A report of the exam with detailed comments and marks is also generated by suitable program code components. The appropriate authority, such as a music examination board, can respond to the user with the results and can check results for quality control. With reference to FIG. 22, a score and a time taken for the examination can be displayed on screen and the user can choose to send the examination or retry in an attempt to achieve a higher score via retry button 2210. Where the examination is a final examination, the retry option may not be available.

The user answers each question in the space provided on screen drawing and assembling the appropriate musical notation and elements thereof as used in questions that require multiple symbol answers. The user's answers are held in global variables until the send button 2200 is pressed. When the send button is pressed the user's answers are sent to the database 150 as text strings and the database 150 can convert the text strings into graphics and recreate the user's graphical answer. Suitable program code components for performing the aforementioned functions when the send button 2200 is pressed follow:

```
on mouseup me
    numquestions = member("number of questions").text
    q1 =  member("Q1aComment").text
```

```
    q2 =    member("Q1bComment").text
    q3 =    member("Q1cComment").text
    q4 =    member("Q2aComment").text
    q5 =    member("Q2bComment").text
    q6 =    member("Q2cComment").text
    q7 =    member("Q2dComment").text
    q8 =    member("Q3aComment").text
    q9 =    member("Q3bComment").text
    q10 =   member("Q3cComment").text
    q11 =   member("Q4aComment").text
    q12 =   member("Q4bComment").text
    q13 =   member("Q4cComment").text
    q14 =   member("Q4dComment").text
    q15 =   member("Q4eComment").text
    q16 =   member("Q4fComment").text
    q17 =   member("Q5Comment").text
    q18 =   member("Q6Comment").text
    q19 =   member("Q7aComment").text
    q20 =   member("Q7bComment").text
    q21 =   member("Q7cComment").text
    if q1 = "" then        q1 = "Q1a,5,0,0,0,0,0,0,Not attempted"
    if q2 = "" then        q2 = "Q1b,5,0,0,0,0,0,0,Not attempted"
    if q3 = "" then        q3 = "Q1c,4,0,0,0,0,0,0,Not attempted"
    if q4 = "" then        q4 = "Q2a,10,0,0,Not attempted"
    if q5 = "" then        q5 = "Q2b,10,0,0,Not attempted"
    if q6 = "" then        q6 = "Q2c,2,0,0,0,Not attempted"
    if q7 = "" then        q7 = "Q2d,2,0,0,0,Not attempted"
    if q8 = "" then        q8 = "Q3a,5,0,0,0,0,0,0,Not attempted"
    if q9 = "" then        q9 = "Q3b,5,0,0,0,0,0,0,Not attempted"
    if q10 = "" then   q10 = "Q3c,3,0,0,0,0,Not attempted"
    if q11 = "" then    q11 = "Q4a,2,0,0,0,Not attempted"
    if q12 = "" then   q12 = "Q4b,2,0,0,0,Not attempted"
    if q13 = "" then   q13 = "Q4c,1,0,0,Not attempted"
    if q14 = "" then   q14 = "Q4d,1,0,0,Not attempted"
    if q15 = "" then   q15 = "Q4e,1,0,0,Not attempted"
    if q16 = "" then   q16 = "Q4f,3,0,0,0,Not attempted"
    if q17 = "" then   q17 = "Q5,19,0,0,Not attempted"
    if q18 = "" then   q18 = "Q5,14,0,0,Not attempted"
    if q19 = "" then   q19 = "Q7a,8,0,0,0,0,0,0,0,0,Not attempted"
    if q20 = "" then q20 = "Q7b,5,0,0,0,0,0,0,Not attempted"
    if q21 = "" then   q21 = "Q7c,5,0,0,0,0,0,0,Not attempted"
    userNamevar = externalParamValue ("sw1")
    passWord = externalParamValue ("sw2")
    firstName = externalParamValue ("sw3")
    lastName = externalParamValue ("sw4")
    testId = externalParamValue ("sw5")
    -- Use variables to create a URL to pass data back to the database.
    urltext = "/members/popup2.php?type=test&id="& testId
&"&username="& userNamevar &"&password="& passWord
&"&numquestions="& numquestions & "&q1="& q1 &"&q2="& q2
&"&q3="& q3 &"&q4="& q4 &"&q5="& q5 &"&q6="& q6 &"&q7="&
q7 &"&q8="& q8 &"&q9="& q9 &"&q10="& q10 &"&q11="& q11
&"&q12="& q12 &"&q13="& q13 &"&q14="& q14 &"&q15="& q15
&"&q16="& q16 &"&q17="& q17 &"&q18="& q18 &"&q19="&
q19 &"&q20="& q20 &"&q21="& q21
    gotonetpage (urltext)
end
```

The results of marking each question are sent to the database 150 and a report is generated with each question marked. In some embodiments, the marks and comments are compiled into a table, which can be emailed to the user and the appropriate authority in the form of the examination result.

According to some embodiments, when the send button 2200 is pressed, the position of every bitmap and text is stripped from the user's answer and converted to a string to copy the answers, but in a list format. The name of the graphic and its location is thus copied and transmitted to the database 150. This avoids the need to send a large graphic file that would take a long time to upload. An exact copy of all the graphics used for the examination is stored in the database 150. The server can then recreate the graphics of users' answers for quality control purposes and/or to address any disputes. Suitable program code components for performing this function when the send button is pressed follow:

```
on makelistforServer
    member("qu17list").text = ""
    qu1list = [:]
    myitem = 0
    repeat with sp = 1 to 320
        if sprite(sp).member <> member (0) then
            myitem = myitem + 1
            if sprite(sp).member.type = #text then sptextin = sprite(sp).member.text
            else sptextin = ""
            if sprite(sp).member.type = #shape then splineWidthin = sprite(sp).linesize
            else splineWidthin = ""
            if sprite(sp).member.type = #vectorshape then splineEquationIn = sprite(sp).member.vertexlist
            else splineEquationIn = ""
            addprop qu1list, #newitem, [#itemNum:
myitem, # spNum: sp, # spMember: sprite(sp).member,
#sploc: sprite(sp).loc, #spink: sprite(sp).ink, #sptext:sptextin,
#sprect:sprite(sp).rect, #splineWidth: splineWidthin,
#splineEquation: splineEquationIn]
                        end if
    end repeat
        member("qu17list").text = string(qu1list)
end
```

It should be appreciated that an important aspect of the present invention is that the predetermined thresholds used to determine whether the users' answers are correct are adjustable according to, for example, the level or standard being examined and/or the requirements of a particular examination authority. For example, greater tolerance or deviation from an exactly correct value can be set via the predetermined thresholds for lower level examinations. For example, for lower level examinations, the predetermined threshold can be set such that an angle in a user's answer must be within 30 degrees of the correct angle. For higher level examinations, the predetermined threshold can be set such that an angle in a user's answer must be within 10 degrees of the correct angle.

The aforementioned exemplary program code components have been provided for enablement purposes and it will be appreciated that the functionality of the present invention can be achieved using alternative program code components written in alternative languages. In one embodiment, the program code components are executed in Macromedia Director, but alternative applications can be employed. It will further be appreciated that the lessons and examinations can comprise a wide range of questions, only a sample of which have been described herein.

Hence, the electronic system, methods and apparatus for teaching and examining music of the present invention thus provide solutions to the aforementioned problems of the prior art. The embodiments of the present invention provide a series of lessons and examinations to educate the user in all aspects of music theory and assess their competency in the skills they have acquired. The user can be taught how, and assessed on, the correct formation and positioning of musical notation using one or more menus comprising icons the selection of which enables the user to form an element of musical notation, such as a stem, head, curve etc. Alternatively, where other skills are being taught and assessed, the user is provided with one or more menus with the notes and other musical symbols already formed for insertion on a preformed staff. According to some embodiments, the user can have as many attempts as they desire at the exercises to reinforce the principals without the need to erase their previous answer as would be required with some of the prior art. Instant feedback is provided to the user in the form of hints, tips and marks on their answers in sharp contrast to the prior art where there is often a significant delay in providing feedback. The animation capabilities of the present invention enhance the learning experience and the user is also able to hear the notes and tunes forming at least part of the answer. Marking of the questions is immediate and automatic upon the user requesting their answer(s) to be marked, thus avoiding the costs incurred with the prior art of having each answer paper marked individually and manually. The system of the present invention enables users in one or more locations to be taught and examined and users, tutors and examining authorities can be provided with instant feedback on the users' progress and the grades achieved. Furthermore, automatic tabulation of the results enables comparisons to be easily made between the results Such comparisons may be, for example, between different results of the same user of between results for the same examination or level of different users.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A method of teaching and examining in the field of music, said method including:
    presenting a user with one or more musical tasks suitable for assesing the user's competency in correctly forming musical notation;
    providing a menu with one or more selectable icons, selection of one of said icons activating functionality to enable the user to form an element of musical notation;
    determining whether the formed element of musical notation had been correctly formed by the user, by comparing one or more characteristics of the formed element of musical notation formed by user with one or more predetermined thresholds stored for the formed element of musical notation; and
    generating a mark that indicates the user's competency in correctly forming the formed element of musical notation, the mark reflective of whether the element of musical notation had been correctly formed by user based on the result of comparing the one or more characteristics of the element of musical notation with the one or more predetermined thresholds.

2. The method of claim 1, wherein comparing the one or more characteristics of the element of musical notation with one or more predetermined thresholds and/or generating a mark is in response to a user request.

3. The method of claim 1, wherein the element of musical notation comprises: a note, a part of a note, a note stem, a note head, a note beam, a quaver tail, a musical symbol, part of a musical symbol, a flat, a sharp, a natural, a crotchet rest, a bass clef, a treble clef, a bar line, a slur, a line, a curve, a hook, a leger line, a staff line, a time signature, an accidental, a dynamic, an articulation.

4. The method of claim 1, wherein the characteristic of the element of musical notation comprises: a position on a musical staff, a spacing between an adjacent element, an angle, a length, an alignment, a point of intersection, a start point, an end point, a ratio, relative size, a name, a quantity.

5. The method of claim 1, further including adjusting at least one of the predetermined thresholds prior to comparing the one or more characteristics of the element of musical notation with the one or more predetermined thresholds or adjusting at least one of the predetermined thresholds according to a level or standard of examination.

6. The method of claim 1, further including generating an audible sound or an animation based on the musical task and/or an answer to the musical task provided by the user.

7. The method of claim 1, wherein selection of one of said icons includes enabling the user to draw, paste, and/or position the element of musical notation on a screen.

8. The method of claim 1, further including:
    displaying one or more comments and/or hints in response to the one or more characteristics of the element of musical notation falling outside the one or more predetermined thresholds;
    transmitting the mark via a communication network to a storage facility; or
    storing the user's response to the musical task as global variables converting the global variables to text strings for transmission to a storage facility the storage facility converting the text strings to graphics to recreate the user's response to the musical task.

9. The method of claim 1, wherein the functionality enables the user to input the one or more characteristics of the element of musical notation, the method further comprising:
    receiving the one or more characteristics;
    forming the element of musical notation based on the received one or more characteristics; and
    comparing the one or more characteristics of the element of musical notation with one more predetermined thresholds within which the element of musical notation is determined to be correct.

10. A system for teaching and examining in the field of music, said system comprising:
    a display adapted to present a user with one or more musical tasks suitable for assessing the user's competency in correctly forming musical notation, and a menu with one or more selectable icons;
    an input device adapted to receive from the user to a selection of the one or more selectable icons; and
    a processor coupled to be in communication with the display and the input device, the processor configured to:
        a) activate functionality to enable the user to form an element of musical notation with the input device in response to selection of one of said icons;
        b) compare one or more characteristics of the element of musical notation formed by the user with one or more predetermined thresholds; and
        c) generate a mark that indicates the user's competency in correctly forming the formed element of musical notation, the mark reflective of whether the element of musical notation had been correctly formed by the user, based on the result of comparing the one or more characteristics of the element of musical notation with the one or more predetermined thresholds.

11. The system of claim 10, further comprising a storage facility coupled to be in communication with the processor to store the marks and/or user's responses to the one or more musical tasks.

12. The system of claim 10, wherein the predetermined thresholds are adjustable prior to comparing the one or more characteristics of the element of musical notation with the one or more predetermined thresholds.

13. The system of claim 10, the processor further configured to generate an audible sound or an animation based on the musical task and/or an answer to the musical task provided by the user.

14. The system of claim 10, wherein selection of one of said icons includes enabling the user to draw, paste, and/or position the element of musical notation on a screen.

15. The system of claim 10, the processor further configured to:
- cause the display of one or more comments and/or hints in response to the one or more characteristics of the element of musical notation falling outside the one or more predetermined thresholds; and/or
- convert the user's response to the musical task stored as global variables in a memory coupled to be in communication with the processor to text strings for transmission to a storage facility.

16. The system of claim 15, wherein the storage facility is configured to convert the text strings to graphics to recreate the user's response to the musical task.

17. An apparatus for teaching and examining in the field of music, said apparatus comprising:
- computer readable program code components configured to present a user with one or more musical tasks suitable for assessing the user's competency in correctly forming musical notation;
- computer readable program code components configured to cause providing a menu with one or more selectable icons, selection of one of said icons activating functionality to enable the user to form an element of musical notation;
- computer readable program code components configured to determine whether the formed element of musical notation had been correctly formed by the user, by comparing one or more characteristics of the formed element of musical notation formed by the user with one or more predetermined thresholds stored for the selected element of musical notation; and
- computer readable program code components configured to generate a mark that indicates the user's competency in correctly forming the formed element of musical notation, the mark reflective of whether the element of musical notation had been correctly formed by the user, based on the result of comparing one or more characteristics of the element of musical notation with one or more predetermined thresholds.

18. The apparatus of claim 17, further comprising computer readable program code components configured to cause adjusting at least one of the predetermined thresholds prior to comparing the one or more characteristics of the element of musical notation with the one or more predetermined thresholds;
- generating an audible sound and/or an animation based on the musical task and/or an answer to the musical task provided by the user;
- displaying one or more comments and/or hints in response to the one or more characteristics of the element of musical notation falling outside the one or more predetermined thresholds; or
- transmitting the mark via a communication network to a storage facility; the storage facility to convert the text strings to graphics to recreate the user's response to the musical task.

* * * * *